United States Patent
Chen et al.

(10) Patent No.: US 10,594,674 B1
(45) Date of Patent: Mar. 17, 2020

(54) USER AUTHENTICATION BASED ON PROBABILISTIC INFERENCE OF THREAT SOURCE

(71) Applicant: Allstate Insurance Company, Northbrook, IL (US)

(72) Inventors: Tao Chen, Northbrook, IL (US); Manjunath Rao, Wheeling, IL (US)

(73) Assignee: Allstate Insurance Company, Northbrook, IL (US)

( * ) Notice: Subject to any disclaimer, the term of this patent is extended or adjusted under 35 U.S.C. 154(b) by 340 days.

(21) Appl. No.: 15/727,728

(22) Filed: Oct. 9, 2017

Related U.S. Application Data

(63) Continuation of application No. 14/991,042, filed on Jan. 8, 2016, now Pat. No. 9,813,402.

(51) Int. Cl.
*H04L 9/00* (2006.01)
*H04L 29/06* (2006.01)
*G06F 21/31* (2013.01)

(52) U.S. Cl.
CPC .............. *H04L 63/08* (2013.01); *G06F 21/31* (2013.01)

(58) Field of Classification Search
CPC ...................................................... H04L 63/08
USPC ........................................................... 726/3
See application file for complete search history.

(56) References Cited

U.S. PATENT DOCUMENTS

| | | |
|---|---|---|
| 9,049,211 B1 | 6/2015 | Hearn |
| 2003/0154406 A1 | 8/2003 | Honarvar et al. |
| 2007/0101010 A1 | 5/2007 | Ellison et al. |
| 2008/0146193 A1 | 6/2008 | Bentley et al. |
| 2010/0042511 A1 | 2/2010 | Sundaresan et al. |
| 2010/0199338 A1 | 8/2010 | Craddock et al. |
| 2011/0236872 A1 | 9/2011 | Taylor |
| 2011/0238755 A1 | 9/2011 | Khan et al. |
| 2012/0214442 A1 | 8/2012 | Crawford et al. |
| 2012/0266227 A1 | 10/2012 | Colson |
| 2014/0359750 A1 | 12/2014 | Adams et al. |
| 2015/0006399 A1 | 1/2015 | Markwordt et al. |
| 2016/0148097 A1 | 5/2016 | Genova, III |

OTHER PUBLICATIONS

Non-Final Office Action, dated Jan. 12, 2017, U.S. Appl. No. 14/991,042.
Notice of Allowance, dated Jun. 12, 2017, U.S. Appl. No. 14/991,042.

*Primary Examiner* — Christopher J Brown
(74) *Attorney, Agent, or Firm* — Banner & Witcoff, Ltd.

(57) ABSTRACT

Aspects of the present disclosure are directed to authenticating a user requesting access to a computing resource. To authenticate the user, activity data describing various activities are collected and stored. The activities may be categorized, for example, as work-related activities, personal-related activities, and social-related activities. The activity data may be utilized to generate challenge questions to present to the user. If the user answers enough of the challenge questions correctly, then the user may be successfully authenticated and granted access to one or more computing resources.

20 Claims, 12 Drawing Sheets

| | User ID 904 | Location Type 906 | Start Time 908 | End Time 910 | Day of the Week 912 | Location-Based Threat Ranking 914 | Time-Based Threat Ranking 916 |
|---|---|---|---|---|---|---|---|
| 902a | 101 | Personal | 18:00 | 7:00 | M, T, W, Th, F | 1. Family<br>2. Friend<br>3. Work | 1. Friend<br>2. Work<br>3. Family |
| 902b | 101 | Personal | 0:00 | 23:59 | Sa, Su | 1. Family<br>2. Friend<br>3. Work | 1. Friend<br>2. Work<br>3. Family |
| 902c | 101 | Work | 8:00 | 17:00 | M, T, W, th, F | 1. Work<br>2. Friend<br>3. Family | 1. Work<br>2. Friend<br>3. Family |
| 902d | 102 | Personal | 0:00 | 23:59 | M, T, W, Th, F | 1. Family<br>2. Friend<br>3. Work | 1. Friend<br>2. Work<br>3. Family |
| 902e | 102 | Work | 5:00 | 16:00 | M, W, F | 1. Work<br>2. Friend<br>3. Family | 1. Work<br>2. Friend<br>3. Family |
| 902f | 102 | Work | 10:00 | 20:00 | T, Th | 1. Work<br>2. Friend<br>3. Family | 1. Work<br>2. Friend<br>3. Family |

FIG. 9

USER AUTHENTICATION BASED ON PROBABILISTIC INFERENCE OF THREAT SOURCE

CROSS-REFERENCE TO RELATED APPLICATIONS

This application is a continuation of U.S. patent application Ser. No. 14/991,042 entitled "User Authentication Based on Probabilistic Inference of Threat Source" and filed on Jan. 8, 2016, which is incorporated by reference herein in its entirety.

TECHNICAL FIELD

Aspects of the disclosure generally relate to information security, access control, and authentication. In particular, various aspects of the disclosure relate to security protocols used to authenticate an individual and prevent unauthorized access to the computing resources of a computing system or computing device.

BACKGROUND

Authentication refers to verifying the identity of an individual. One type of authentication mechanism often employed involves authenticating individuals using usernames and passwords. Despite advice to the contrary, individuals often use the same or similar passwords for different user accounts. As a result, compromising one user account of an individual may compromise multiple user accounts. Therefore a need exists for improved authentication mechanisms.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the present disclosure are directed to authenticating a user requesting access to a computing resource. To authenticate the user, activity data describing various activities are collected and stored. The activities may be categorized, for example, as work-related activities, personal-related activities, and social-related activities. The activity data may be utilized to generate challenge questions to present to the user. If the user answers enough of the challenge questions correctly, then the user may be successfully authenticated and granted access to one or more computing resources.

The challenge questions may be generated based on the most likely potential threat source. Since the challenge questions are generated based on work-related, personal-related, and/or social-related activities of the user, potential threat sources include those having work-related, personal-related, and social-related knowledge of the individual being authenticated. For example, if the potential threat source is identified as someone having work-related knowledge of the individual, then the challenge questions may include questions regarding personal-related and/or social-related activities of the user. To minimize the threat from multiple potential threat sources, a set of challenge questions may include each of a work-related challenge question, a personal-related challenge question, and a social-related challenge question. The potential threat source may be identified based on the time the authentication request was received at and the location the authentication request was received from.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 9 depicts an example activity profile table in accordance with aspects described herein.

DETAILED DESCRIPTION

Figure 1A:
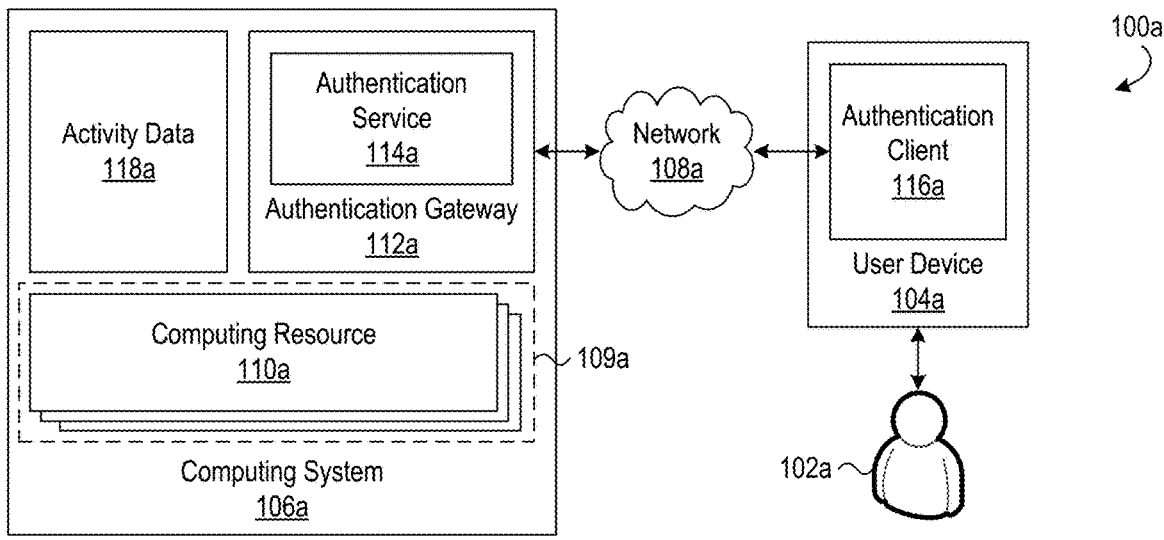
FIG. 1A depicts a first example of an implementation of a system configured for authenticating a user operating a user device in accordance with aspects described herein.

In the following description of the various embodiments, reference is made to the accompanying drawings, which form a part hereof, and in which is shown by way of illustration, various embodiments of the disclosure that may be practiced. Other embodiments may be utilized.

As a general introduction to the subject matter described in more detail below, aspects described herein are directed to authenticating an individual by challenging the individual to answer questions related to activities that individual has knowledge of. The activities may be relatively recent activities that involve the user, e.g., activities taking place within the past few minutes, hours, days, weeks, or even months. The questions are selected to reduce the risk that an impostor knows the details of the activities used to create the challenge questions. For example, activities may fall into one of three categories: work activities, personal activities, and social activities. While co-workers may have knowledge of work activities, family members may have knowledge of personal activities, and friends may have knowledge of social activities, it is unlikely that an impostor has knowledge of all three types of activities. Therefore, to authenticate the individual, multiple challenge questions are generated based on the different types of activities and presented to the individual. If the individual answers the questions correctly, the individual is successfully authenticated and granted access to one or more computer resources.

To generate the challenge questions, data describing the activities is obtained from multiple devices associated with the individual and stored. The data used to generate the questions is continually updated with the occurrence of new activities. The activity data for relatively new activities may be used to generate the challenge questions while the activity data for relatively older activities may be discarded. Generating challenge questions based on relatively new activities provides additional security should the activity data become compromised. Compromised activity data may simply be discarded, and the activity data for new events may replenish the pool used to generate the challenge questions.

For convenience, the following terminology is adopted herein. The terminology used below, however, should not be construed as limiting the claimed subject matter in any way.

In general, activities include any activity that an individual is expected to have knowledge of either as a result of directly participating in or performing the activity, as a result of initiating the activity, or as a result of learning about the activity through a relationship with an individual that participated in or performed the activity. Activities include events involving an individual as well as actions performed by the individual. Activities include physical activities that occur in the real-world, e.g., physical, real-world events involving the individual and physical, real-world actions performed by the individual. Activities also include virtual activities that occur at a computing device, e.g., virtual events involving the individual and virtual actions performed by the individual. Virtual activities include virtual activities occurring on a local computing device directly operated by the individual as well as virtual activities occurring on a remote computing device in signal communication with a local computing device operated by the individual. Activities also include events involving machines associated with the individual as well as actions performed by those machines. The events involving the machine and the actions performed by the machine may also be physical or virtual. Activities also include events involving another individual as well as actions performed by another individual where the individual has knowledge of the activity as a result of a relationship with the other individual (e.g., a professional relationship, a personal relationship, or a social relationship).

Interrogative aspects of the activity refer to the "Five Ws" used for information gathering. An activity, as used herein, is associated with at least four interrogative aspects: (1) who performed the activity, (2) what activity was performed, (3) when the activity was performed, and (4) where the activity was performed. A fact refers to information describing one of the interrogative aspects of the activity. An interrogative aspect of an activity may be associated with multiple facts. A derived fact refers to information that describes one of the interrogative aspects of the activity and is generated from or otherwise obtained using a fact.

Challenge questions refer to questions that are presented to an individual for the purposes of authenticating the individual. An answer set accompanies each challenge question and includes multiple answer selections (i.e., choices). Challenge questions may prompt the user to select one of the answer choices as the answer to the challenge question.

Concrete examples of activities, facts, derived facts, challenge questions, answer sets, and answer selections are found throughout the disclosure. The examples found below are provided by way of example only to help illustrate the aspects associated with the authentication techniques described herein. Additional and alternative examples will be appreciated with the benefit of the disclosures provided herein.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. Furthermore a set, as used herein, refers to a collection of one or more elements.

The authentication techniques described herein may be used in addition to or in lieu of authentication using a username and password. Additional aspects will be appreciated upon review of the additional disclosures provided in further detail below.

Referring now to FIG. 1A, a first example of an implementation of a system 100a configured for authenticating a user 102a operating a user device 104a is shown. As seen in FIG. 1A, the user device 104a is in signal communication with a computing system 106a via a network 108a. The computing system 106a may include or otherwise provide access to a set 109a of computing resources 110a. The computing system 106a, in this example, also includes an authentication gateway 112a configured to provide an authentication service 114a. The user device 104a includes an authentication client 116a configured to exchange communications with the authentication gateway 112a and invoke the authentication service 114a in order to authenticate the user 102a. The computing system 106a, in this example, also stores the activity data 118a used for the authentication process.

In an example scenario, the user 102a may operate the user device 104a and request access to one of the computing resources 110a of the computing system 106a. In response to this access request, the authentication client 116a may transmit, to the computing system 106a, an authentication request. The authentication client 116a may format the authentication request according to a format required by the authentication service 114a. The authentication gateway 112a may receive the authentication request and invoke the authentication service 114a. The authentication service 114a may then determine whether to authenticate the user 102a. This scenario is described by way of example only. Additional and alternative scenarios will be appreciated with the benefit of this disclosure.

As described in further detail below, authenticating the user 102a may include, in example implementations, determining an authentication context for the authentication request, identifying a potential threat source based on the authentication context, generating a set of challenge questions to present to the user, transmitting the set of challenge questions to the user device 104a for presentation to the user, receive answers to the challenge questions from the user device, and determining whether or not to successfully authenticate the user based on the answers to the challenge questions.

In FIG. 1A, the computing system 106a itself includes the components configured to carry out the authentication process. The arrangement depicted in FIG. 1A is but one example of a possible arrangement for the user device 104a, computing system 106a, and authentication gateway 112a in the system 100a for authenticating a user. Alternative implementations, configurations, and arrangements may be selectively employed.

Figure 1B:
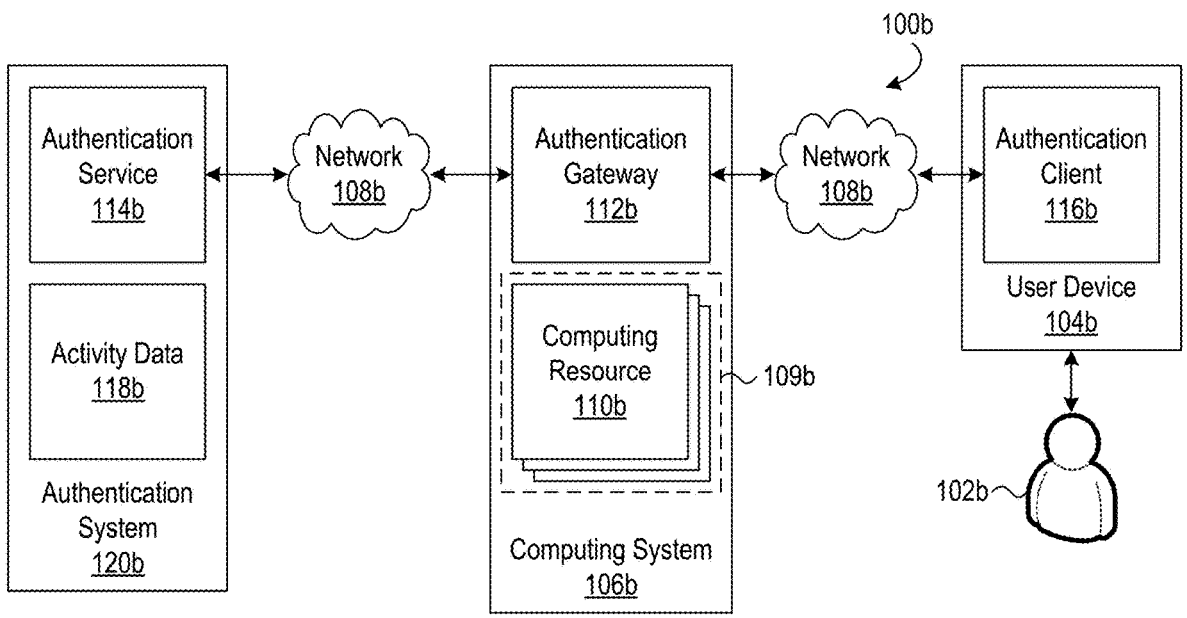
FIG. 1B depicts a second example of an implementation of a system configured for authenticating a user operating a user device in accordance with aspects described herein.

In FIG. 1B, for example, a second example of an implementation of a system 100b configured for authenticating a user 102b operating a user device 104b is shown. The system 100b in FIG. 1B similarly includes a user device 104c in signal communication with a computing system 106b via a network 108b. The user device 104c likewise includes an authentication client 116b, and the computing system 106b likewise includes a set 109b of computing resources 110b as well as an authentication gateway 112b.

In contrast to FIG. 1A, however, the authentication service 114b and the activity data 118b in FIG. 1B reside at an authentication system 120b. The authentication service 114b, in this example, is in signal communication with the authentications gateway 112b via the network 108b. Accordingly, the computing system 106b delegates to the authentication system 120b the responsibility of determining whether to authenticate the user 102b. With the example arrangement depicted in FIG. 1B, the authentication system 120b may handle the authentication process on behalf of multiple computing systems such as, e.g., computing system 106b. In this way, computing systems (such as the computing system 106b) may only need to be configured to proxy the authentication request received from a user device (such as the user device 104b), the challenge questions generated for the user 102b to answer, and the answers received.

In an example scenario, the user 102b may operate the user device 104b and transmit, to the computing system 106b, a request to access to one of the computing resources 110b. The access request may be received, for example, at a web gateway of the computing system 106b which has been omitted from FIG. 1B for the sake of clarity. The web gateway may handle inbound and outbound communications between the computing system 106b and the user device 104b and/or the authentication system 120b. In response to this access request, the authentication gateway 112b may generate an authentication request and transmit the authentication request to the authentication system 120b. The authentication gateway 112b may also format the authentication request according to a format required by the authentication service 114b. The authentication system 120b may also include a web gateway (also omitted for the sake of clarity) to handle inbound authentication requests and outbound authentication responses. The authentication gateway 112b may proxy the communications exchanged between the authentication service 114b and the authentication client 116b. In another example implementation, the authentication gateway 112b may simply relay the communications exchanged between the authentication service 114b and the authentication client 116b. In either scenario, the authentication service 114b may determine whether to authenticate the user 102b and provide the authentication result to the computing system 106b. If successfully authenticated, the computing system 106b may grant the user device 104b access to one or more of the computing resources 110b. These scenarios are again described by way of example only. Additional and alternative scenarios will be appreciated with the benefit of this disclosure.

Figure 1C:
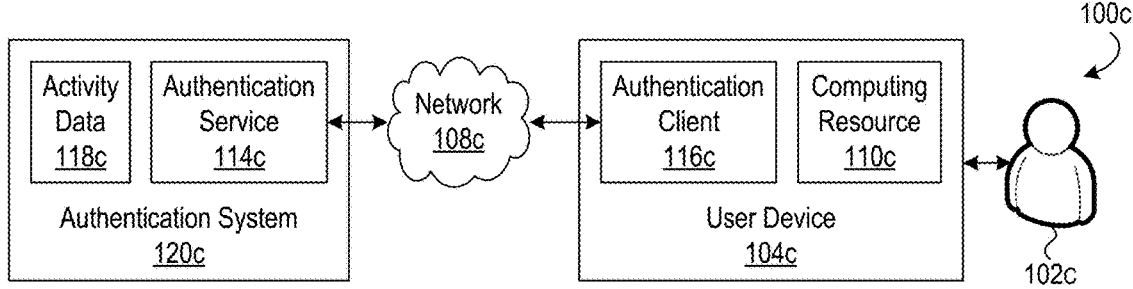
FIG. 1C depicts a third example of an implementation of a system configured for authenticating a user operating a user device in accordance with aspects described herein.

In FIG. 1C, for example, a third example of an implementation of a system 100c configured for authenticating a user 102c operating a user device 104c is shown. FIG. 1C again includes a user device 104c that includes an authentication client 116c. In FIG. 1C, however, the computing resource 110c resides at the user device 104c, and the user device 104c is in signal communication with the authentication system 120c via the network 108c. The authentication system 120c similarly includes the authentication service 114c and the activity data 118c. The authentication client 116c may thus invoke the authentication service 114c to authenticate the user 102c at the user device 104c. The authentication system 120c may also include a web gateway as described above to handle the inbound and outbound communications exchanged between the authentication system 120c and the user device 104c. In this way, the authentication system 120c may handle the authentication process on behalf of multiple user devices such as, e.g., user device 104c. If successfully authenticated, the authentication client 116c may grant the user 102c access to the computing resource 110c. The authentication client 116c may grant access to the computing resource 110c in particular (e.g., upon launch of the computing resource) or to the user device 104c in general (e.g., during a login attempt at the user device).

In an example scenario, the user 102c may request access to the computing resource 110c. In response to the access request, the authentication client 116c may generate and transmit an authentication request to the authentication system 120c. The authentication client 116c may also format the authentication request according to a format required by the authentication service 114c. Upon receipt of the authentication request, the authentication service 114c may then determine whether to authenticate the user 102c and grant the user access to the computing resource 110c.

The computing resources 110a-b may include various types of computing resources. Examples of computing resources include: software applications, programs, and services (native and virtualized); data stores, databases, and computer files; processors and processing time; hardware, input/output (I/O) devices, peripherals; and other types of computer components that access control mechanisms may limit access to. As seen in FIGS. 1A-C, computing resources may reside locally at a user device directly operated by a user and/or may reside remotely at a computing device indirectly operated by the user via a local user device.

The networks 108a-c may include various types of networks. For example, the networks 108a-c may include one or more of a wired network and/or a wireless network. Example networks that may be selectively employed include wired and wireless local area networks (LANs), wide area networks (WANs) such as the Internet, cellular communication networks, and other types of wired and wireless networks configured for telecommunication. Network communications may utilize various network communication protocols. Examples of network communication protocols that may be selectively employed include TCP/IP, Ethernet, FTP, HTTP, GSM, CDMA, Wi-Fi (802.11), and WiMAX.

Figure 2:
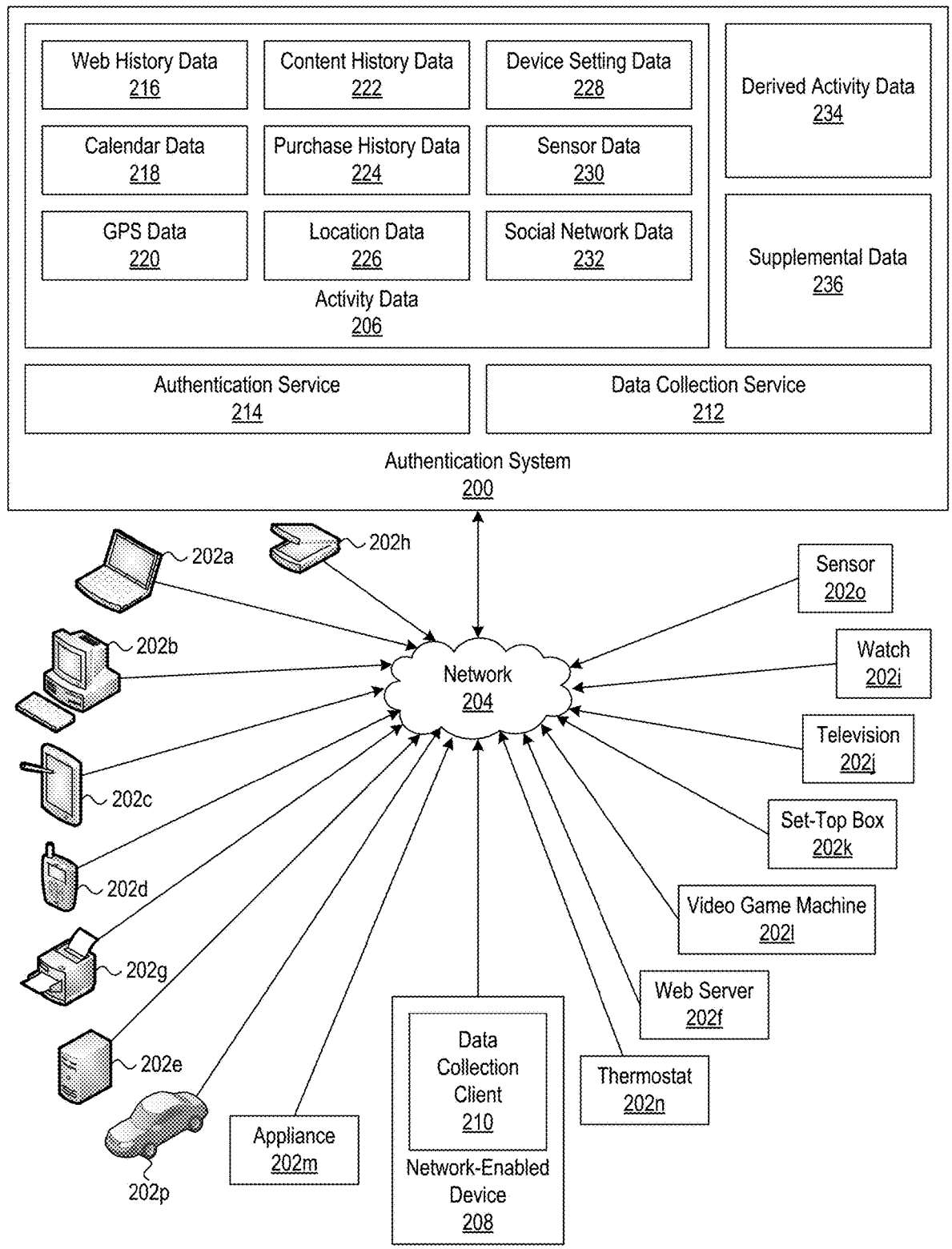
FIG. 2 depicts an example of an implementation of an authentication system in accordance with aspects described herein.

With reference to FIG. 2, an example of an implementation of an authentication system 200 is shown. As seen in FIG. 2, the authentication system 200 is in signal communication with multiple network-enabled devices 202 (collectively) via a network 204. The network 204 may be the same as or at least similar to the networks 108a-c discussed above with reference to FIGS. 1A-B. As also described above, the network-enabled devices 202 may provide the authentication system 200 with activity data 206 describing activities associated with those network-enabled devices. The network devices 202 may include any device configured to communicate via a wired or wireless network. The network devices 202 may include, for example, any device configured such that it may be considered as part of the Internet of Things.

Various types of network-enabled devices in signal communication with the authentication system 200 are shown by way of example in FIG. 2. The example network-enabled devices 202 in FIG. 2 include various types of computing devices such as a laptop computing device 202a, a desktop computing device 202b, a tablet computing device 202c, a mobile telephone 202d (e.g., a "smartphone"), a computer server 202e, and a particular type of computer server, a web server 202f. The example network-enabled devices 202 in FIG. 2 also include various types of computer peripherals such as a printer 202g and a scanner 202h. The example network-enabled devices 202 in FIG. 2 also include various types of consumer products such as a watch 202i, a television 202j, a set-top box 202k (e.g., a cable television receiver and/or digital video recorder/DVR), and a video game machine 202l. The example network-enabled devices 202 in FIG. 2 also include various types of home products such as an appliance 202m (e.g., a refrigerator, a dishwasher, an oven, a stove, a washing machine, a coffee maker, a water heater, and alarm, and the like), and a thermostat 202n. The example network-enabled devices 202 in FIG. 2 also include a sensor 202o (e.g., a motion sensor, a presence sensor, a light sensor, a pressure sensor, a fluid sensor, a sound sensor, a temperature sensor, a chemical sensor, an electric sensor, a magnetic sensor, a vibration sensor, and the like). The example network-enabled devices 202 in FIG. 2 also include a vehicle 202p wherein the activity data describes trips taken in the vehicle (e.g., departure time, arrival time, destination, route, number of passengers, and the like). The example network-enabled devices 202 in FIG. 2 may also include wearable computing devices that are configured to mount or otherwise attach to a user (e.g., on the finger, hand, wrist, arm, neck, chest, ear, head, leg, ankle, foot, and the like) and configured to mount, attach to, or be incorporated within clothing worn by the user (e.g., wrist-worn devices such as "smartwatches" and activity trackers, head-mounted displays such as "smartglasses," virtual reality headsets, and the like).

FIG. 2 also depicts a network-enabled device 208 that includes a data collection client 210. The data collection client 210 may be configured to retrieve information stored at or generated by the network-enabled device 208 and transmit the retrieved information to the authentication system 200 for storage as activity data 206. The data collection client 210 may be configured to package the retrieved information with, for example, an identifier for the individual the network-enabled device is associated with (e.g., the owner or the user), an identifier for the network-enabled device 208 itself, a date the information was retrieved on, a time the information was retrieved at, and the like. The identifiers for the individual and the device may be any type of identifier that uniquely identifies the individual or device. The data collection client 210 may be configured to transmit the retrieved information in real-time, at regular or irregular intervals, in response to a triggering event, in response to receipt of a request from the authentication system 200, and the like. For example, the data collection service 212 may be configured to query the data collection client 210 for device information that may be used to generate challenge questions. The request from the data collection service 212 may request a particular item of information, and the data collection client 210 may be configured to respond with the requested information. Additionally or alternatively, the request from the data collection service 212 may be a generic request, and the data collection client 210 may be configured to select which item of information to provide. The data collection client 210 may, for example, randomly select one or more of various device settings of the network-enabled device 208 and provide the one or more selected device settings to the data collection service 212 in response to the request. The example network devices 202 in FIG. 2 may each include a data collection client that is the same as or at least similar to the data collection client 210 and thus be similarly configured to retrieve and transmit information to the authentication system 200.

The authentication system 200, in this example, includes a data collection service 212 and an authentication service 214. The authentication service 214, in this example, is configured to perform the authentication process using the activity data 206. The authentication process will be discussed in further detail below.

The data collection service 212, in this example, is configured to manage the collection of information provided by the network-enabled devices 202 and 208. The data collection service 212, in this example, thus represents the interface between the authentication system 200 and the network-enabled devices 202 and 208. The data collection service 212 may be configured to receive communications from the network-enabled devices 202 and 208, extract information from those communications, and store the extracted information as activity data 206. The data collection service 212 may specify a required format for the communications. The format may specify the parameters that should be used to transmit information to the authentication system for storage as activity data 206. For example, the format may specify that a communication should provide one or more of a user identifier, a device identifier, a device type, a date, a time, an information type, and an information payload. The data collection service 212 may be configured to passively receive communications containing new information for storage as activity data 206. Additionally or alternatively, the data collection service 212 may be configured to actively request new information from the network-enabled devices 202 and 208, e.g., at regular or irregular intervals or in response to a triggering event. For example, the data collection service 212 may actively request new information from a network-enabled devices in response to a determination that a threshold percentage of the activity data 206 associated with a particular individual is older than a predetermined timeframe (e.g., two weeks).

As seen in FIG. 2, a variety of network-enabled devices 202 may provide information to the authentication system 200 for storage as activity data 206. Accordingly, the activity data 206, in this example, includes a variety of types of data. As seen in FIG. 2, the activity data 206 includes web history data 216, calendar data 218, Global Positioning System (GPS) data 220, content history data 222, purchase history data 224, location data 226, device setting data 228, sensor data 230, and social network data 232. The types of activity data depicted in FIG. 2 and listed above are provided by way of example only. The activity data 206 stored at the authentication system 200 may include additional and alternative types of activity data which will be appreciated with the benefit of this disclosure.

The various types of activity data 206 may include data describing or otherwise associated with various types of activities. Web history data 216, for example, may be associated with websites visited, computer files downloaded, computer files uploaded, and other types of activities an individual may engage in when browsing web sites. Calendar data 218, for example, may be associated with past or future meetings, appointments, invitations, anniversaries, and other types of activities that an individual may keep track of in a calendar. GPS data 220, for example, may include latitude and longitude coordinates, elevation, heading, and other types of GPS-related information. Content history data 222, for example, may be associated with audio and/or visual content consumed by the individual such as songs, playlists, albums, or radio stations listened to by the individual as well as video clips, web shows, television shows, or movies watched by the individual. Purchase history data 224, for example, may be associated with purchases made by the individual from brick-and-mortar merchants or online merchants. Location data 226 may be associated with locations visited by the individual such as towns, cities, states, countries, retail establishments, places of business, points of interest, and other types of locations an individual may travel to. Device setting data 228, for example, may be associated with a configurable parameter an individual has selected for a network-enabled device such as a start-up time, a shut-down time, an operating level, and other types of settings an individual may select for a device. Sensor data 230, for example, may be associated with various types of measurements taken by various types of sensors such as volume, temperature, voltage, current, and other types of measurements that may be taken. Social network data 232, for example, may be associated with activities an individual engages with on a social network such establishing a new social connection/relationship, sharing content, liking shared content, commenting on shared content, and other types of activities a user may engage in on a social network. Additional types of activity data will be appreciated with the benefit of this disclosure.

As noted above, the authentication service 214 utilizes the activity data 206 to generate challenge questions to be presented to an individual during an authentication process. Given the various types of activity data 206 that may be collected and stored, various types of challenge questions may be generated. Examples of challenge questions based on the web history data 216 include, "What news web site do you typically visit each weekday morning before work?" and "What day last week did you download a 50 MB file?" Examples of challenge questions based on the calendar data 218 include, "When did you meet with Bob C. last week?" and "Who recently invited you to play golf next Wednesday?" Regarding the GPS data 220, this data may be utilized to derive other data (e.g., location data 226). Accordingly, examples of challenge questions based on data derived from the GPS data 220 include, "What town did you have dinner in last night?" and "What floor was your room on at Hotel X last week?" Examples of challenge questions based on the content history data include, "What album did you listen to this past Sunday afternoon?" and "What movie did you stream on Saturday night?" Examples of challenge questions based on the purchase history data 224 include, "Which store did you make a purchase of about $200 on Thursday evening?" and "Which mobile application did you make an 'in-app' purchase in yesterday?" Examples of challenge questions based on the location data 226 include, "Which meeting room did you meet with Bob C. in on Tuesday?" and "Which road is the comic book store you visited Saturday morning located on?" Examples of challenge questions based on the device setting data 228 include, "What time is your coffee maker programmed to start in the morning?" and "What temperature is your thermostat programmed for during the workday?" Examples of challenge questions based on the sensor data 230 include "Which night did your exterior motion sensor trigger an alarm?" and "Which evening did your smoke detector trigger an alarm?" Examples of challenge questions based on the social network data 232 include "Which day last week did you and Bob C. become friends?" and "Who liked your new photo posted last night?" The challenge questions listed above are provided to illustrate the range of challenge questions that the authentication system 200 may generate from the activity data 206.

The authentication system 200 may also store additional data that is derived from or that supplements the activity data 206. As seen in FIG. 2, the authentication system 200, in this example includes derived activity data 234 and supplemental data 236. The derived activity data 234 includes data that can be obtained or otherwise generated based on the activity data 206. One example includes deriving the day of the week based on the date identified in a communication received from a network-enabled device 202. Another example includes deriving location data based on GPS information included in a in a communication received from a network-enabled device 202. The data collection service 212 and/or the authentication service 214, for example, may be configured to generate the derived activity data 234, e.g., in response to receipt of a communication from a network-enabled device 202, at regular or irregular intervals based on the activity data 206 stored at the authentication system 200, or during an authentication process.

The supplemental data 236 may be related to an individual, a network-enabled device 202, and/or the activity data 206. The authentication service 214 may utilize the supplemental data 236 when generating the challenge questions, e.g., to obfuscate the questions for a potential impostor. For example, the supplemental data 236 may include a workplace organizational chart. The organizational chart may indicate the professional relationship between the individual being authenticated and various colleagues (e.g., supervisor, boss, teammate, subordinate, client, etc.). When preparing challenge questions based on work-related activities, the authentication service 214 may utilize the organizational chart when phrasing the question and the corresponding answer set. Accordingly, instead of challenging the individual to indicate a particular individual (e.g., "Bob C.," "Bob. D.," etc.) that attended a recent meeting, the individual may be challenged to indicate which professional colleague attended the meeting (e.g., "My boss," "My boss' boss," etc.). Utilizing the organizational chart to structure and phrase the questions further reduces the likelihood that an impostor would have the knowledge necessary to answer the challenge questions. The supplemental data 236 may also include other types of supplemental data including, for example, family relationships to obfuscate family-related questions (e.g., "My brother," "My brother's wife," etc.) as well as social relationships to obfuscate social-related questions (e.g., "My friend," "My friend's friend," etc.). Additional and alternative types of supplemental information will be appreciated with the benefit of this disclosure.

Figure 3:
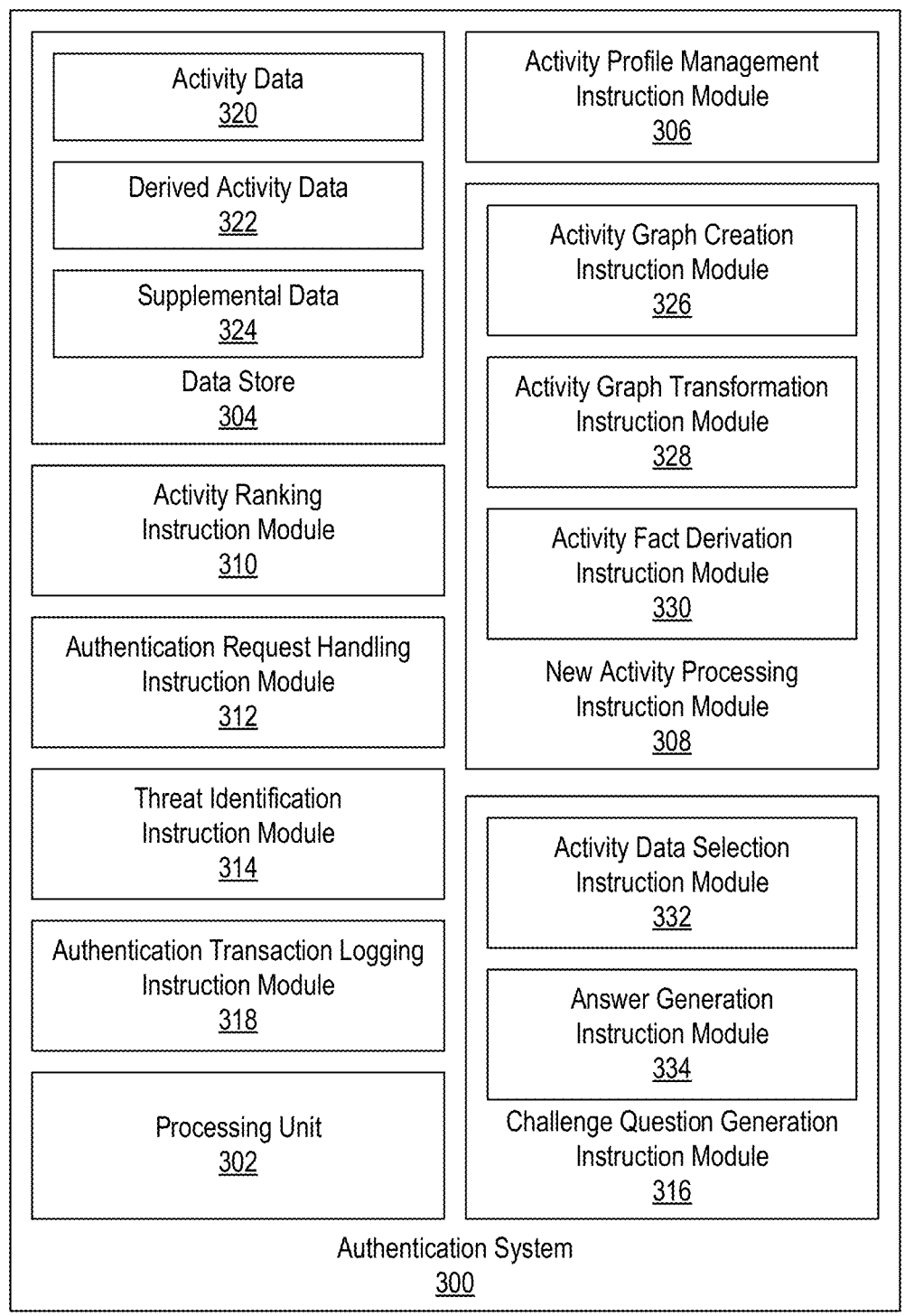
FIG. 3 depicts another example of an implementation of an authentication system in accordance with aspects described herein.

In FIG. 3, another example of an implementation of an authentication system 300 is shown. The authentication system 300, in this example, is a special-purpose computing device configured to perform or initiate aspects associated with authenticating an individual. Accordingly, the authentication system 300 includes various instruction modules that facilitate various aspects of authenticating an individual. The instruction modules described in more detail below may be implemented as independent applications or programs at the computing device or as components (e.g., respective sets of instructions) of a single software application. In addition, an instruction module may be configured to invoke, communicate, or otherwise interact with another one of the instruction modules. Other configurations and arrangements of the instruction modules may be selectively employed, e.g., one or more of the instruction modules may be located on individual computing devices distributed across an internal and/or external network that are in signal communication with each other via the network.

In FIG. 3, the authentication system, in this example, includes a processing unit 302, a data store 304, and various instructions modules 306-318 configured to carry out aspects associated with authenticating an individual. The processing unit 302 may include one or more processors that execute, individually or in combination, the computer-executable instructions of the various instruction modules 306-318. The data store 304 stores activity data 320, derived activity data 322, and supplemental data 324 each of which may be, respectively, the same as or at least similar to the activity data, derived activity data, and supplemental data discussed above with reference to FIG. 2.

The various instructions modules 306-318, in this example, include an activity profile management instruction module 306, a new activity processing instruction module 308, an activity ranking instruction module 310, an authentication request handling instruction module 312, a threat identification instruction module 314, a challenge question generation instruction module 316, and an authentication transaction logging instruction module 318. Each of these various instruction modules 306-318 will be discussed in further detail below.

The activity profile management instruction module 306, in this example, is configured to facilitate the creation and storage of activity profiles associated with individuals that are authenticated using the authentication system 300. The activity profiles provide a baseline of the general activity habits of an individual. For example, an activity profile for an individual may identify when an individual is typically at work, with family, or with friends. The activity profile may be stored, e.g., in the data store 304 of the authentication system 300. The activity profile may be stored, in some example implementations, as an activity profile record in an activity profile table of a database. The database may include multiple activity profile records corresponding to multiple activity profiles respectively associated with multiple individuals that are authenticated using the authentication system 300.

Turning briefly to FIG. 9, an example of an activity profile table 900 that includes multiple activity profile records 902a-f (902 collectively) is shown. In this example activity profile table 900, each activity profile record 902 is associated with an individual. Multiple activity profile records may be associated with a single individual. For example, in the activity profile table 900, the activity records 902a-c are associated with the user having user identifier, "101," and the activity records 902d-f are associated with the user having user identifier, "102."

The activity profile table 900 includes various data elements (e.g., columns) for the activity profile records 902. The data elements, in this example, include a user ID data element 904, a location type data element 906, a start time data element 908, an end time data element 910, a day-of-the-week data element 912, a location-based threat ranking data element 914, and a time-based threat ranking data element 916. As noted above, the user ID data element 904 may store a unique identifier for the individual associated with the activity profile record. The location type data element 906 indicates where the user is typically located for activities occurring between the start and end times identified in the start time data element 908 and the end time data element 910 and on the days indicated in the day-of-the-week data element 912. Location types may include a "work" location type, a "personal" location type, and a "social" location type. As shown by way of example in FIG. 9, the activity profile records 902a-b indicate that the user is typically involved with personal activities between 5:00 PM and 7:00 AM, Monday through Friday and all day on Saturday and Sunday. In addition, the activity profile record 902c indicates that the user is typically involved with work activities between 8:00 AM and 5:00 PM Monday through Friday. The activity profile records 902d-f similarly identify when another user is typically involved with work and personal activities. In some example implementations, any timeframes that do not fall within a timeframe specified in an activity profile for a user may be assigned (e.g., automatically) to the "social" location type.

An authentication system utilizes the threat rankings stored for the location-based threat ranking data element 914 and the time-based threat-ranking data element 916 to identify a potential threat source during an authentication session. The threat rankings are configured to estimate the source of a potential threat based on when an authentication request is received and/or where an authentication request is received from. For example, if an authentication request is received during a time period when the user is believed to be at work (e.g., as indicated by the user's activity profile record), then the most likely threat source may be someone having knowledge of the user's work-related activities. As another example, if an authentication request is received from a location associated with a user's personal time (e.g., from the user's home), then the most likely threat source may be someone having knowledge of the user's personal-related or social-related activities. The rankings stored in the location-based threat rankings 914 and the time-based threat-rankings 916 thus list the potential threat sources based on the values stored in the activity profile records for the location type data element 906, start time data element 908, end time data element 910, and day-of-the-week data element 912. The threat rankings, in this example, are listed in descending order, i.e., the most likely potential threat source is listed first. For example, the location-based threat ranking 914 for the activity profile record 902f—for work activities—lists the most likely threat source as someone with knowledge of the user's work-related activities, followed by someone having knowledge of social-related activities, and finally someone having knowledge of family-related activities. It will be appreciated with the benefit of this disclosure that the particular threat rankings may depend on the particular information stored in the activity record. In addition, the threat rankings may, in some example implementations, automatically select a threat ranking based on the information stored in the activity record.

Turning back to FIG. 3, the activity profile management instruction module 306 may facilitate the creation and configuration of the activity profile records for an individual. For example, the activity profile management instruction module 306 may create an input interface having input elements at which the individual can provide, e.g., a location type, start time, end time, day-of-the-week, etc. The activity profile management instruction module 306 may provide the input interface, e.g., via a web page that is displayed in a web browser, at a computing device via a native or virtual software application, or via a mobile application at a handheld computing device.

The new activity processing instruction module 308, in this example, is configured to receive, process, and store new activity information from devices associated with individuals that are authenticated using the authentication system 300. The new activity processing instruction module 308 may perform functions similar to those of the data collection service 212 described above with reference to FIG. 2. Upon receipt of new activity information, the new activity processing instruction module 308 may format the received activity information for subsequent processing and storage at the data store 304 as the activity data 320.

The new activity processing instruction module 308, in this example, is configured to create a graph of the activity from its corresponding interrogative aspects and facts. The new activity processing instruction module 308 is also configured to transform that graph into a structured text string for storage at the data store 304. Furthermore, the new activity processing instruction module 308 is configured to derive additional facts for the activity associated with the new activity data for storage at the data store 304 as derived activity data 322. In this regard, the new activity processing instruction module 308 includes an activity graph creation instruction module 326, an activity graph transformation instruction module 328, and an activity fact derivation module 330.

The activity graph creation instruction module 326 is configured to create the graph representing the activity based on the activity data. The activity graph creation instruction module 326 may create the graph in memory of the authentication system 300 using one or more data structures, e.g., a graph data structure and a node data structure. A graph, as defined by the graph data structure, may include one or more nodes. A node, as defined by the node data structure, may include one or more respective connections to one or more other nodes. To construct a graph that represents an activity, the node data structure may define two types of nodes, parent nodes that correspond to the interrogative aspects of the activity (e.g., who, what, when, where) and child nodes that correspond to facts for the interrogative aspects of the activity. The node data structure may be configured such that both a parent node and a child node can connect to multiple child nodes.

Figure 8:
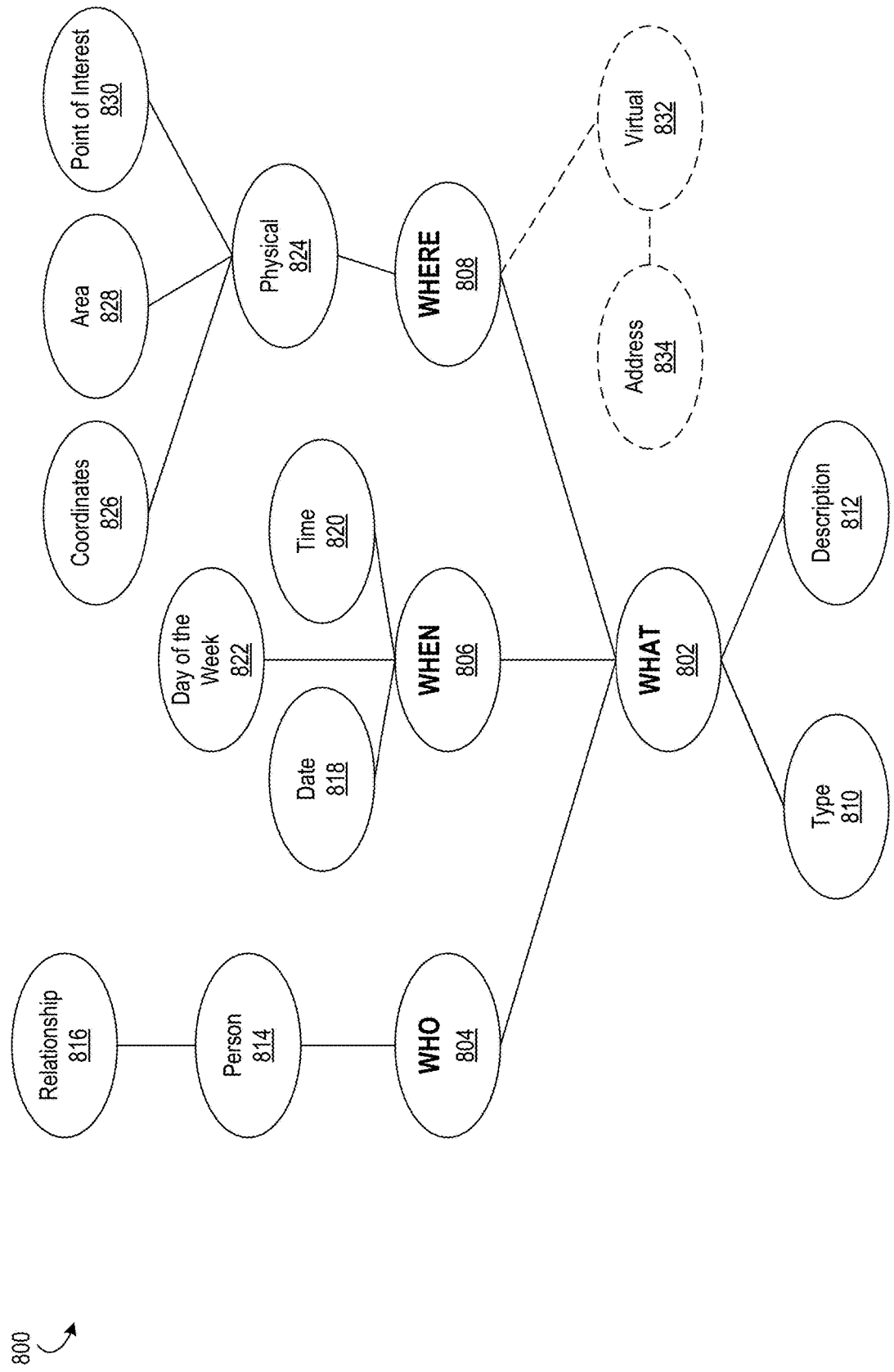
FIG. 8 depicts an example activity graph in accordance with aspects described herein.

Turning briefly to FIG. 8, an example of an activity graph 800 that may be created in response to receipt of activity information is shown. The nodes of the activity graph 800 in FIG. 8 are simply provided to illustrate aspects associated with creating an activity graph that represents an activity of an individual to be authenticated.

As seen in FIG. 8, the activity graph 800 includes four parent nodes 802-808 that each respectively corresponds to one of the interrogative aspects of the activity. For example, parent node 802 corresponds to "what" the activity is, parent node 804 corresponds to "who" was involved in the activity, parent node 806 corresponds to "when" the activity occurred, and parent node 808 corresponds to "where" the activity occurred. Each parent node 802-808, in this example, is connected to one or more child nodes, some of which are connected to other child nodes. For example, parent node 802 ("what") is connected to two child nodes 810-812. Child node 810, in this example, corresponds to an activity type (e.g., work, personal, social, device) and child node 812 corresponds to an activity description (e.g., "meeting," "dinner," "purchase," "sensor reading"). The parent node 804 ("who") is connected to one child node 814 which is in turn connected to another child node 816. Child node 814, in this example, corresponds to an individual associated with the activity (e.g., meeting participant, dinner guest, social network friend), and child node 816 corresponds to a relationship between the person identified by child node 814 and the person associated with the activity (e.g., boss, family member, commenter). The parent node 806 ("when"), in this example, is connected to three child nodes 818-822. Child node 818, in this example, corresponds to the date of the activity, child node 820 corresponds to the time of the activity, and child node 822 corresponds to the day of the week on which the activity occurred. As noted above, the day of the week identified in child node 822 may be a derived fact based on the date identified in the child node 818. The parent node 808 ("where") is connected to one child node 824 which is in turn connected to three more child nodes 826-830. The child node 824, in this example, corresponds to a physical location at which the activity occurred (e.g., a room, an office, a place of business, a town). The subsequent child nodes thus describe the physical location. Child node 826, in this example, corresponds to location coordinates for the physical location (e.g., latitude/longitude), child node 828 corresponds to the area in which the activity occurred (e.g., town name, city name, street address), and child node 830 corresponds to a point of interest at which the activity occurred (e.g., room name, building name, business name). The area and point of interest respectively identified in child nodes 828 and 830 may also be facts derived from the coordinates identified in child node 826. As noted above, the location at which an activity occurs may be a virtual location. Accordingly, the parent node 808 ("where") is also shown to be connected in the alternative to a child node 832 which is in turn connected to child node 834. Child node 832, in this example, corresponds to a virtual location at which the activity occurred (e.g., a web site, a social network account), and child node 834 corresponds to the address at which the virtual activity occurred (e.g., website address, social network profile address).

Turning back to FIG. 3, the activity graph transformation instruction module 328, in this example, is configured to transform an activity graph (e.g., activity graph 800 in FIG. 8) into a structured text string or text document. By transforming the activity graph into a structured text string or text document, the authentication system 300 may more efficiently store, process, and search the activity data 320. Accordingly, in example implementations, the activity data 320 may include one or more structured text strings and/or structured text documents that respectively describe one or more activities. The structured text strings and/or structured text documents include the activity information received from the network-enabled devices of the users. In example implementations, Apache Solr may be selectively employed to generate, process, and search the structure text strings and/or structured text documents.

Figures 10, 11:
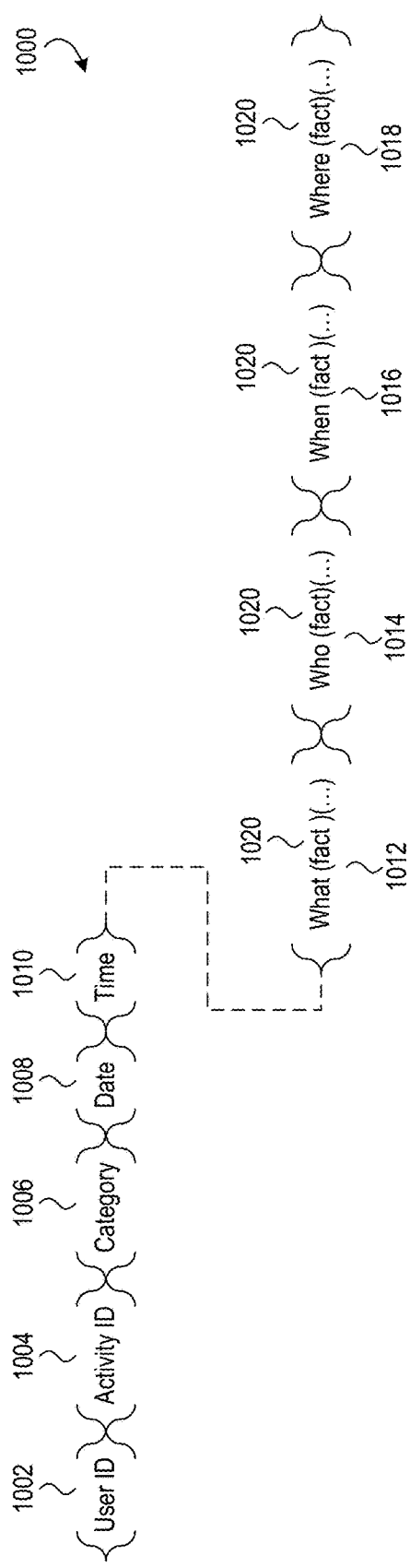
FIG. 10 depicts an example of a structured text string corresponding to an activity in accordance with aspects described herein.
FIG. 11 depicts an example activity ranking table in accordance with aspects described herein.

Turning briefly to FIG. 10, an example of a structured text string 1000 that may be created from an activity graph is shown. The structured text string 1000, in this example, includes a user ID substring 1002, an activity ID substring 1004, a category substring 1006 (e.g., work-related, family-related, social-related), a date substring 1008, a time substring 1010, and substrings 1012-1018 corresponding to the interrogative aspects of the activity. In particular, the structured text string 1000 includes a "what" substring 1012, a "who" substring 1014, a "when" substring 1016, and a "where" substring 1018. Each of the substrings 1012-1018 for the interrogative aspects of the activity may also include one or more substrings 1020 that correspond to one or more facts for the interrogative aspect. The values of the sub strings in the structured text string 1000 may correspond to the values of the nodes of an activity graph (e.g., activity graph 800 in FIG. 8).

Turning back to FIG. 3, the activity fact derivation module 330, in this example, is configured to derive additional facts associated with an activity based on the activity data received for that activity. The activity fact derivation module 330 may derive additional facts in the same manner or at least a similar manner as described above with reference to FIG. 2. After deriving new facts for an activity, the activity fact derivation module 330 may invoke the activity graph generation instruction module 326 to update the graph by adding new child nodes that correspond to the derived activity facts.

The activity ranking instruction module 310, in this example, is configured to rank the activities described by the activity data 320. Activity rankings may be based on historical data that describes the success and failure rate of authentication transactions. Authentication transactions may also be identified as either a legitimate authentication request in which the actual user requested authentication or an intrusion attempt in which an impersonator requested authentication. Legitimate authentication requests may be distinguished from intrusion attempts based on whether the authentication request was ultimately successful and access granted to a computing resource. For example, as described in this disclosure, an actual user may incorrectly answer one of the challenge questions presented, but ultimately be successfully authenticated if a threshold number of challenge questions. In these circumstances, those authentication requests may be identified as legitimate authentication requests. On the other hand, if an authentication request is ultimately denied, e.g., for failing to correctly answer a threshold number of challenge questions, then that authentication request may be identified as an intrusion attempt. Challenge questions answered correctly during authentications ultimately identified as intrusion attempts may be relatively less secure, e.g., as they may be easier for impersonators to guess. The historical data corresponding to successful and unsuccessful authentication requests may include data indicating the challenge questions presented during those authentication requests and the types of activities used to generate those challenge questions as well as the authentication context in which the authentication request occurred (e.g., the time, date, and location at which the authentication request was received).

The activity ranking instruction module 310 may thus employ probabilistic models that utilize the historical data to determine what types of activities are relatively better or worse for the current authentication context. In other words, the probabilistic models may be employed to determine which types of activities are more likely to be answered incorrectly by impersonators. For example, if the historical data indicates that certain types of personal-related questions are answered correctly relatively more often during intrusion attempts, then those types of questions may be identified as relatively less secure and thus receive a lower ranking. In addition, the probabilistic models may be employed to determine which types of activities are more likely to be answered correctly by actual users. For example, if the historical data indicates that questions based on activities only hours old are answered correctly relatively more often during legitimate authentication requests, then those types of questions may be ranked relatively higher than other types of questions, e.g., questions based on week-old activities. The rankings may also be specific to a group of users based on a common demographic across that group and/or be specific to individual users. Over time, the authentication system may learn which types of activities are relatively more or less secure for generating challenge questions based on the successful and unsuccessful authentication requests.

The activity ranking instruction module 310 may be configured to obtain an overall ranking score for each activity (e.g., a score between 0.0 and 1.0). The activity ranking instruction module 310 may also be configured to obtain individual ranking scores for each interrogative aspect of the activity. The activity ranking instruction module 310 may obtain an overall ranking score for an activity based on the individual ranking scores for the interrogative aspects, e.g., by combining and or averaging the individual ranking scores.

Turning briefly to FIG. 11, an example of an activity ranking table 1100 that includes multiple activity ranking records 1102a-f (1102 collectively) is shown. In this example activity ranking table 1100, each activity ranking record 1102 is associated with a respective activity. The activity ranking table 1100 includes various data elements (e.g., columns) for the activity ranking records 1102. The data elements, in this example, include an activity ID data element 1104, an activity category data element 1106 (e.g., work-related, personal-related, social-related), respective interrogative aspect data elements 1108-1114, and an overall ranking data element 1116. The interrogative aspect data elements include a "who" ranking data element 1108, a "what" ranking data element 1110, a "when" ranking data element 1112, and a "where" ranking data element 1114.

The authentication request handling instruction module 312, in this example, is configured to receive and process authentication requests. Handling an authentication request may include, identifying the individual to be authenticated, identifying a potential threat source, generating challenge questions for the individual to answer, transmitting the challenge questions to a device for presentation to the individual, receiving answers to the challenge questions from the device, determining whether the answers to the challenge questions are correct, providing an indication of whether the individual has been successfully authenticated, and logging the authentication transaction. Accordingly, when handling an authentication request, the authentication request handling instruction module 312 may invoke and/or communicate with threat identification instruction module 314, the challenge question generation instruction module 316, and the authentication transaction logging instruction module 318.

In some example implementations, the authentication request handling instruction module 312 may be configured to generate and transmit all of the challenge questions in one communication to the device requesting authentication. In other example implementations, the authentication request handling instruction module 312 may transmit each challenge question individually in sequence. For example, the authentication request handling instruction module 312 may transmit a first challenge question in response to the authentication request, transmit a second challenge question in response to receipt of an answer to the first challenge question, and so forth. In this way, subsequent challenge questions may be based on whether a previous challenge question was answered correctly or incorrectly.

In addition, the authentication request handling instruction module 312 may determine whether to successfully authenticate the individual based on the number of correct answers to the challenge questions. In some example implementations, the authentication request handling instruction module 312 may require an individual to answer each challenge question correctly (e.g., 100%) in order to be successfully authenticated. In other example implementations, the authentication request handling instruction module 312 may successfully authenticate the individual when the individual correctly answers some threshold number or percentage of challenge questions (e.g., 2 out of 3, 75%).

The threat identification instruction module 314, in this example, is configured to identify a potential threat source when an authentication request is received. As noted above, potential threat sources may include someone having knowledge of the work-related activities, the personal-related activities, and/or the social-related activities of an individual. To identify a potential threat source, the threat identification instruction module 314 may determine the date and time the authentication request was received and/or the location from which the authentication request was received. The location may include a physical, real-world location of the device that initiated the authentication request (e.g., latitude/longitude coordinates) and/or a network location from which the authentication request was received. By determining the location the authentication request was received from, the threat identification instruction module 314 may determine whether the authentication request originated at a work location (e.g., from an office), a personal location (e.g., from home), or elsewhere.

Having identified the date, time, and location associated with the authentication request, the threat identification instruction module 314 may retrieve the activity profile records for the individual to be authenticated (e.g., the activity profile records 902 in the activity profile table 900 of FIG. 9). The threat identification instruction module 314 may thus compare the date, time, and location to the respective activity profile records associated with the individual in order to determine the potential threat source, e.g., based on the location-based or time-based threat rankings for the activity profiles retrieved. For example, if an authentication request is received from a work location and/or during a time the individual is typically at work, then the threat identification instruction module 314 may identify the most likely threat source to be someone with knowledge of the work-related activities of that individual. As another example, if an authentication request is received from a personal location (e.g., from home) and/or during a time the individual is typically engaged in personal activities, then the threat identification instruction module 314 may identify the most likely threat source to be someone with knowledge of personal-related activities. As a further example, if an authentication request is received from a location that is not a work location and not a personal location and/or outside of work or personal time, then the threat identification instruction module 314 may identify the most likely threat source to be someone with knowledge of social-related activities. Furthermore, the threat identification instruction module 314 may identify multiple threat sources and rank those threat sources from most likely to least likely based on the date, time, and location information associated with the authentication request. As seen in FIG. 9, for example, example threat rankings include: 1) family, 2) friend, 3) work or, alternatively, 1) work, 2) friend, 3) family.

Having identified the potential threat source, the challenge questions may be generated. For example, if the potential threat source is identified as someone with work-related knowledge of the individual, then the challenge questions generated may be related to personal and/or social activities of the individual. As another example, if the potential threat source is identified as someone with personal-related knowledge of the individual, then the challenge questions generated may be related to work and/or social activities of the individual. As a further example, if the potential threat source is identified as someone with social-related knowledge of the individual, then the challenge questions generated may be related to work and/or personal activities of the individual. In example implementations, the challenge questions may include one of each type of challenge question, e.g., a work-related challenge question, a personal-related challenge question, and a social-related challenge question.

The challenge question generation instruction module 316, in this example, is configured to generate the challenge questions presented to an individual during an authentication session. Generating challenge questions may include selecting portions of the activity data 320 with which to generate the challenge questions as well as generating answer sets for the challenge questions generated. Accordingly, the challenge question generation instruction module 316, in this example, includes an activity data selection instruction module 332 and an answer generation instruction module 334.

The activity data selection instruction module 332, in this example, is configured to select the activity data 320 used to generate the challenge questions. As noted above, the challenge questions may be based on the potential threat source identified. Accordingly the activity data selection instruction module 332 may be configured to select portions of the activity data 320 based on the potential threat source identified. For example, if the potential threat source has been identified as someone with work-related knowledge of the individual, then the activity data selection instruction module 332 may select portions of the activity data 320 describing personal activities and social activities of the individual. If the potential threat source has been identified as someone with personal-related knowledge of the individual, then the activity data selection instruction module 332 may select portions of the activity data 320 describing work activities and social activities of the individual. If the potential threat source has been identified as someone with social-related knowledge of the individual, then the activity data selection instruction module 332 may select portions of the activity data 320 describing personal activities and work activities of the individual.

The activity data selection instruction module 332 may also select portions of the activity data based on a comparison of the dates associated with the activities and the date of the authentication request. For example, the activity data selection instruction module 332 may only select portions of the activity data 320 that are less than x days/weeks/months old (e.g., seven days, two weeks, one month). For some individuals, it may be more difficult to remember particular details associated with activities that occur more frequently as compared to activities that occur less frequently. For example, an individual may attend a status meeting every week but take a vacation only once or twice a year. Accordingly, it may be more difficult for the individual to recall particular details of a status meeting that occurred three weeks ago as compared to a vacation that occurred three weeks ago. For this reason, the activity data selection instruction module 332 may be configured such that the timeframes within which portions of the activity data 320 may be selected for use in a challenge question depend on the frequency with which the type of activity occurs. In other words, in some implementations, activity data associated with activities that occur more frequently may go stale faster than activity data associated with activities that occur less frequently. As noted above, the set of challenge questions may include a challenge question for each type of activity, e.g., a work-related challenge question, a personal-related challenge question, and a social-related challenge question. Accordingly, the activity data selection instruction module 332 may select portions of the activity data 320 corresponding to each of a work-related activity, a personal-related activity, and a social-related activity.

Having selected the activity data 320 for the challenge question, the challenge question generation instruction module 316 may construct a question based on the activity data selected. As described above, multiple facts may describe an activity including various facts associated with the interrogative aspects of the activity (e.g., who, what, when, where). To generate a challenge question, the challenge question generation instruction module 316 may first select one of the interrogative aspects of the activity and then select a fact associated with the selected interrogative aspect. The challenge question generation instruction module 316 may be configured to select the interrogative aspect at random. Where there are multiple facts associated with the selected interrogative aspect, the challenge question generation instruction module 316 may also select one of the associated facts at random. In some implementations, facts that have been already been used may not be used again. In some implementations, facts that have already been used may not be used again until some threshold amount of time has elapsed following the previous use (e.g., within the past hour, day, week, etc.). Having selected the interrogative aspect and corresponding fact, the challenge question generation instruction module 316 may construct the challenge question itself. The challenge question generation instruction module 316 may utilize the other interrogative aspects of the activity data 320 to construct the question.

Consider the following example structured text string for a personal-related activity of an individual: {user ID: "101"} {activity ID: "224"} {category: "personal"} {date: "2015-02-24"} {time: "19:30"} {WHAT (dinner)} {WHO (Julia R.)(Malcom E.)} {WHEN (Tuesday)} {WHERE(62.32, −150.11)(Anytown, USA)(Restaurant)(Uncle Jose's)}. Based on this one activity, the challenge question generation instruction module 316 may generate multiple questions. Example questions that may be generated based on this example activity include: (i) "What did you do with Julia R. and Malcolm E. last Friday?" (ii) "Who did you have dinner with at Uncle Jose's on Friday?" (iii) "When did you last eat at Uncle Jose's?" and (iv) "Where did you eat dinner with Julia R. and Malcolm E. recently?" Having constructed the question, the challenge question generation instruction module 316 may then construct the answer set for the individual to select from.

The answer generation instruction module 334, in this example, is configured to generate the answer set for a challenge question. The answer generation instruction module 334 includes in the answer set multiple possible answers to the challenge question including the correct answer. The correct answer in the answer set corresponds to the fact selected from the activity data 320 associated with the activity. The number of possible answers may depend on the constraints of a particular implementation. However, the likelihood of successfully guessing the correct answer decreases as the number of answer selections increases. For example, the chances of successfully guessing the correct answer in an answer set with seven answer selections is about 14%, is about 12% for an answer set with eight answer selections, and is 10% for an answer set with ten answer selections. Accordingly, the answer generation instruction module 334 may be configured to first select how many answer selections to include in the answer set. The number of answer selections may be a configurable parameter at the authentication system 300.

The answer generation instruction module 334, in this example, is also configured to generate one or more incorrect answers for the answer set based on the fact selected from the activity data 320. For quantitative answers (e.g., dates, times, device settings, etc.), the answer generation instruction module 334 may generate answer selections above and below the correct answer, e.g., by adding to or subtracting from the quantitative value corresponding to the correct answer. With reference to the example activity above, the correct answer to the question, "Around what time did you eat at Uncle Jose's last week?" is "around 7:30 PM." Accordingly, an example answer set that may be generated for this question may include the following answer selections: (a) "around 11:30 AM," (b) "around 12:30 PM," (c) "around 1:30 PM," (d) "around 2:30 PM," (e) "around 5:30 PM," (f), "around 6:30 PM," (g) "around 7:30 PM," and (h) "around 8:30 PM." As another example, the correct answer to the question, "On what date did you eat at Uncle Jose's last week?") is "on Feb. 24th." Accordingly, an example answer set that may be generated for this additional question may include the following answer selections: (a) "on Feb. 21st," (b) "on Feb. 22nd," (c) "on Feb. 23rd," (d) "on Feb. 24th," (e) "on Feb. 25th," (f) "on Feb. 26th," and (g) "on Feb. 28th." Additional examples will be appreciated with the benefit of this disclosure. With respect to non-quantitative values, the answer generation instruction module 334 may be configured to select answers of the same type as the correct answer. For example, where the correct answer is a day of the week, the answer generation instruction module 334 may include each day of the week as an answer selection in the answer set. Where the correct answer is the name of an individual, the answer generation instruction module 334 may select other names at random to include in the answer set. Regarding the example activity above, one of the correct answers to the question, "Who did you have dinner with at Uncle Jose's last Friday?" is "Malcolm E." Accordingly, an example answer set that may be generated for this question may include answer selections with names selected or generated at random, e.g., an answer set including the following answer selections: (a) "Malcolm E.," (b) "David S.," (c) "Whitney M.," (d) "Betsy G.," (e) "Kevin S.," (f) "Matt C.," (g) "Jeremy B.," and (h) "Allan N." As another example, the correct answer to the question, "What did you do with Julia R. and Malcom E. last week?" is "have dinner." Accordingly, an example answer set that may be generated for this question may include answer selections with various activities selected at random, e.g., an answer set including the following answer selections: (a) "go to a movie," (b) "have dinner," (c) "go bowling," (d) "go dancing," (e) "sing karaoke," (f) "play cards," and (g) "go skating." Additional examples will be appreciated with the benefit of this disclosure.

The answer generation instruction module 334 may also be configured to query other data sources to generate the answers for a challenge question. For example, when generating a challenge question based on the location at which an activity occurred, the answer generation instruction module 334 may query a map data source or a point-of-interest data source to identify other locations within the vicinity of the location of the activity. For example, if the challenge question is based on a point-of-interest the individual visited (e.g., a retail store, a restaurant, etc.), the answer generation instruction module 334 may query a data source for other points-of-interest near the point-of-interest associated with the activity. The authentication system 300 may also store lists of activities, points-of-interests (e.g., a list of retail stores, a list of restaurants, a list of websites, a list of social networks, etc.) and the answer generation instruction module 334 may select from those lists (e.g., at random) when generating the answer set to a challenge question. The answer generation instruction module 334 may also generate the answer set based on other activities associated with the individual. For example, the challenge question may ask which point-of-interest (e.g., a restaurant) the individual visited on a particular day, and the answer set may include multiple points-of-interest actually visited by the individual on various days (e.g., multiple restaurants visited the previous month).

As noted above, the answer generation instruction module 334 may also utilize the supplemental data 324 when creating and configuring the answer set for a challenge question. As an example, a challenge question may be based on a work meeting involving the individual and a supervisor (e.g., "Peter A."). The answer generation instruction module 334 may obtain a work organizational chart associated with the individual to determine that "Peter A." is a supervisor of the individual. Accordingly, the answer generation instruction module 334 may configure the answer selections of the answer set to identify a professional relationship (e.g., "your supervisor," "your assistant") rather than specific names (e.g., "Peter A.," "Tim H.").

The challenge question generation instruction module may also be configured to generate challenge questions phrased in the negative. Examples of challenge questions phrased in the negative include, (i) "Who was not present at the meeting on Thursday?" (ii) "Who did not join you for lunch Sunday afternoon?" and (iii) "What day did you not go to the gym last week?"

The challenge question generation instruction module 316 may be configured to generate challenge questions at various points. For example, the challenge question generation instruction module 316 may generate challenge questions associated with a new activity as soon as the authentication system 300 receives, processes, and stores the new activity data for that activity. In other words, the challenge question generation instruction module 316 may generate one or more challenge questions before an authentication request is received, and store the challenge questions generated at the data store 304 as part of the activity data 320. In response to an authentication request, the authentication request handling instruction module 312 may select an activity and one or more challenge questions previously generated for that activity to present to the individual being authenticated. Additionally or alternatively, the challenge question generation instruction module 316 may generate one or more challenge questions for an activity in response to receipt of the authentication request itself.

The authentication transaction logging instruction module 318, in this example, is configured to log authentication transactions. Accordingly, the data store 304 may also store an authentication transaction log in which the log entries correspond to authentication transactions carried out by the authentication system 300. An authentication log entry may include various data elements associated with the authentication transaction, for example, the date and time of the authentication, one or more device identifiers from which the authentication request was received (e.g., a MAC address), one or more virtual locations from which the authentication request was received (e.g., a network domain, an IP address), one or more physical locations the authentication request was received from (e.g., latitude/longitude coordinates, city, state), one or more activities selected to challenge the user with, the identified potential threat source, one or more challenge questions selected to present to the user, the answer sets associated with the challenge questions, the answer selections received from the user, whether the answer selections were correct, and whether the user was successfully authenticated. The authentication transaction log may be subsequently analyzed (e.g., at regular or irregular intervals) to assess the effectiveness of the challenge questions.

For example, the authentication system 300 may include a machine learning instruction module that analyzes the authentication transaction log in order to identify which challenge questions are relatively easier or harder to guess. Log entries for unsuccessful authentications may provide useful data for determining what types of facts a potential impostor is more or less likely to be able to guess. Consider an unsuccessful authentication in which two challenge questions were answered incorrectly and one challenge question was answered correctly. The challenge question answered correctly may thus correspond to an activity fact that is relatively easier to guess. The machine learning instruction module may utilize this information to flag that activity fact as a less useful for authentication due to the relative ease of guessing the answer. In addition, the machine learning instruction module may identify where potential threat sources are arising with respect to an individual. Consider another unsuccessful authentication in which a personal-related and a social-related challenge question were answered incorrectly, but a work-related question was answered correctly. The correctly answered work-related challenge question, in this example, may suggest that the potential threat source is someone with knowledge of the work-related activities of an individual. Furthermore, the authentication system may utilize this information to assess the likelihood that the potential threat source identified is correct. In other words, if the potential threat source is identified as a work-related threat, and an unsuccessful authentication involved a correctly answered work-related challenge question, then the authentication system may conclude that its initial assessment of the potential threat source was likely to be correct. If, however, the potential threat source is identified as a work-related threat, and an unsuccessful authentication involved an incorrectly answered work-related challenge question but a correctly answered personal-related challenge question, then the authentication system may readjust how it identifies the potential threat sources. The machine learning module may employ probabilistic algorithms (e.g., a Markov decision process, a Bayesian probability model, etc.) to learn from each successful or unsuccessful authentication and, if necessary, readjust the rankings of the activities and activity facts used to generate the challenge questions. The authentication system may also use the analysis of the authentication log entries to inform individuals where likely threats are arising. For example, if the analysis of the authentication logs indicate multiple unsuccessful authentications with a relatively high number of work-related challenge questions answered correctly, then the individual may be informed that someone with work-related knowledge associated with that individual has been impersonating the individual in an attempt to gain unauthorized access to a computing resource. Upon receipt of such feedback, individuals may investigate the potential threat source and/or take greater care in securing their access credentials and/or the information associated with their activities (e.g., their calendar information). In some implementations the machine learning instruction module may reside at another computing system or computing device that is in signal communication with the authentication system 300.

The authentication system 300, in this example, may also be configured to perform additional and alternative operations and thus include additional and alternative instruction modules. Furthermore, in other implementations, an authentication system may include additional and alternative instructions modules configured to carry out additional and alternative aspects associated with authenticating an individual which will be appreciated with the benefit of this disclosure.

Figure 4:
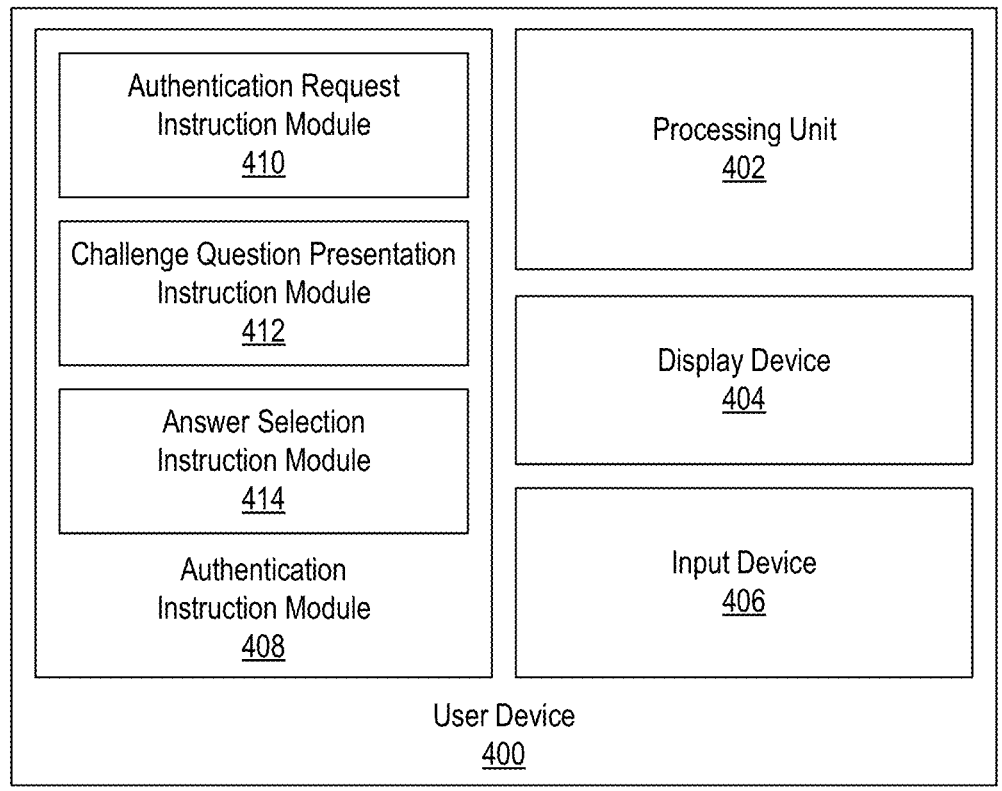
FIG. 4 depicts an example of an implementation of a user device in accordance with aspects described herein.

In FIG. 4, an example of an implementation of a user device 400 is shown. The user device 400 may be in signal communication with a remote computing system that handles the authentication process. Accordingly, the user device 400 may transmit the authentication request to the remote computing system, receive the challenge questions in response, receive user input that selects respective answers to the challenge questions, and transmits the answer selections back to the remote computing system. In this regard, the user device 400, in this example, includes a processing unit 402 having one or more processors, a display device 404 (e.g., a display screen) that presents the challenge questions and corresponding answer sets, an input device 406 (e.g., a touchscreen) used to provide the user input.

The user device 400, in this example, also includes an authentication instruction module 408 configured to facilitate the authentication process at the user device. Accordingly, the user device 400, in this example, includes an authentication request instruction module 410, a challenge question presentation instruction module 412, and an answer selection instruction module 414. The authentication request instruction module 410, in this example, is configured to generate and transmit the authentication request. The challenge question presentation instruction module 412, in this example, is configured to generate the user interface based on the challenge questions received in response to the authentication request. The answer selection instruction module 414, in this example, is configured to generate and transmit the response to the challenge questions that includes the selected answer.

Figure 5:
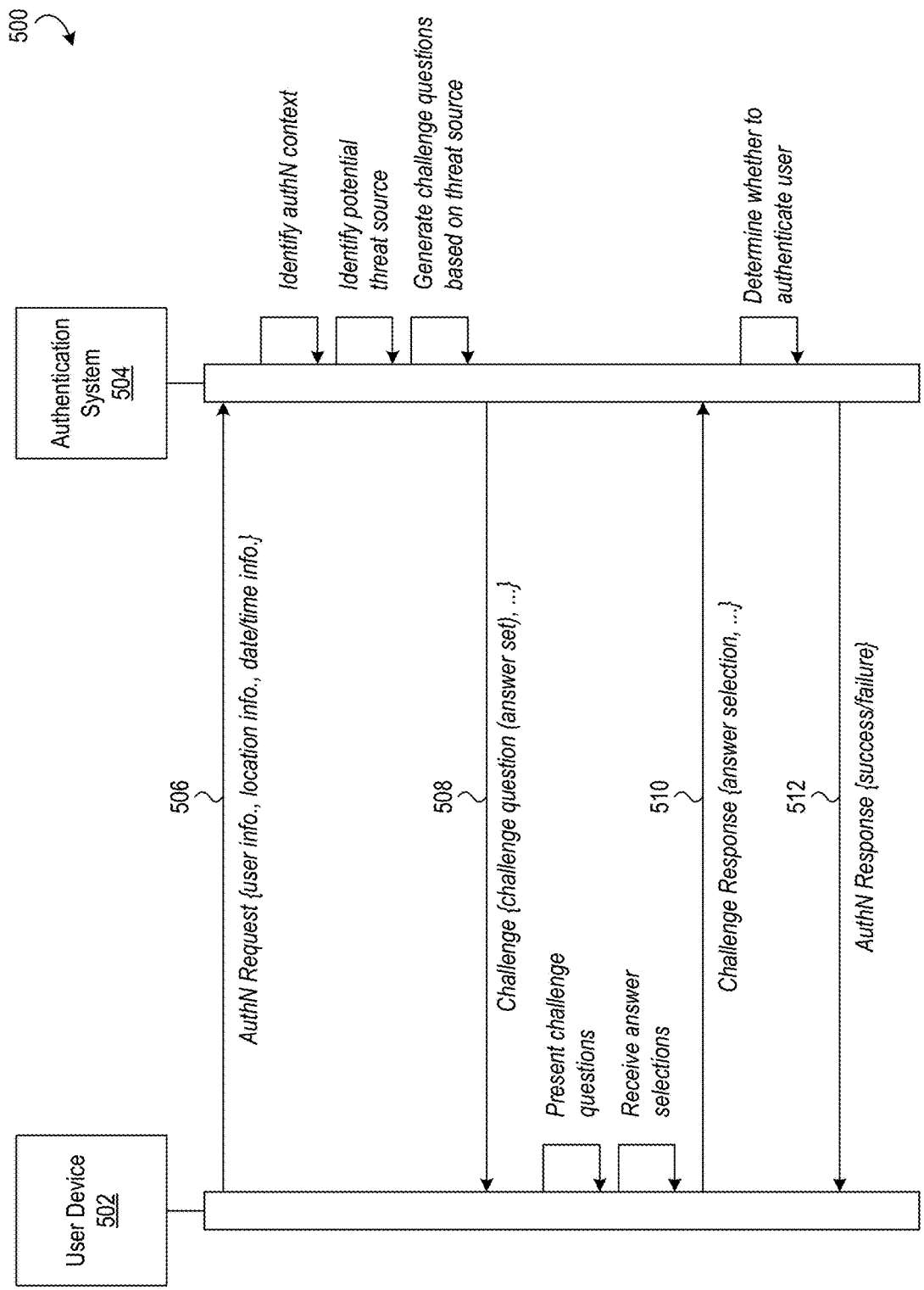
FIG. 5 depicts a sequence diagram of an example authentication process in accordance with aspects described herein.

Referring now to FIG. 5, a sequence diagram of an example authentication process is shown. As seen, a user device 502 is in signal communication with an authentication system 504. The user device 502 may transmit an authentication request 506 that includes, e.g., user information, location information, date information, and time information. Upon receipt of the authentication request 506, the authentication system 504 may identify the authentication context, e.g., identify the location, date, and time associated with the authentication request. Having identified the authentication context, the authentication system 504 may identify and rank one or more potential threat sources based on the authentication context, e.g., using the activity profiles associated with the user being authenticated. Having identified and ranked the potential threat sources, the authentication system 504 may then generate one or more challenge questions based on the identified threat sources. The authentication system 504 may then transmit a challenge 508 back to the user device 502 that contains one or more challenge questions and the corresponding answer sets. Upon receipt of the challenge questions, the user device 502 may present the challenge questions to the user and receive answer selections from the user. Having received the answer selections from the user, the user device 502 may transmit a challenge response 510 that includes the answer selections received from the user. Upon receipt of the answer selections, the authentication system 504 may determine whether to successfully authenticate the user based on whether the user correctly answered the challenge questions. The authentication system 504 may then transmit an authentication response 512 back to the user device 502 indicating whether the user has been successfully authenticated.

Additional and alternative sequences will be appreciated with the benefit of this disclosure. For example, the authentication system 504 may be configured to transmit challenge questions one at a time such that a subsequent challenge question is not transmitted until it has received an answer to a previously transmitted challenge question. In this way, the authentication system 504 may tailor subsequent questions based on whether a previous question is answered correctly or incorrectly. In addition, the authentication requests/responses and the challenge requests/responses may be proxied through a remote computing system residing between the user device 502 and the authentication system 504.

Figure 6:
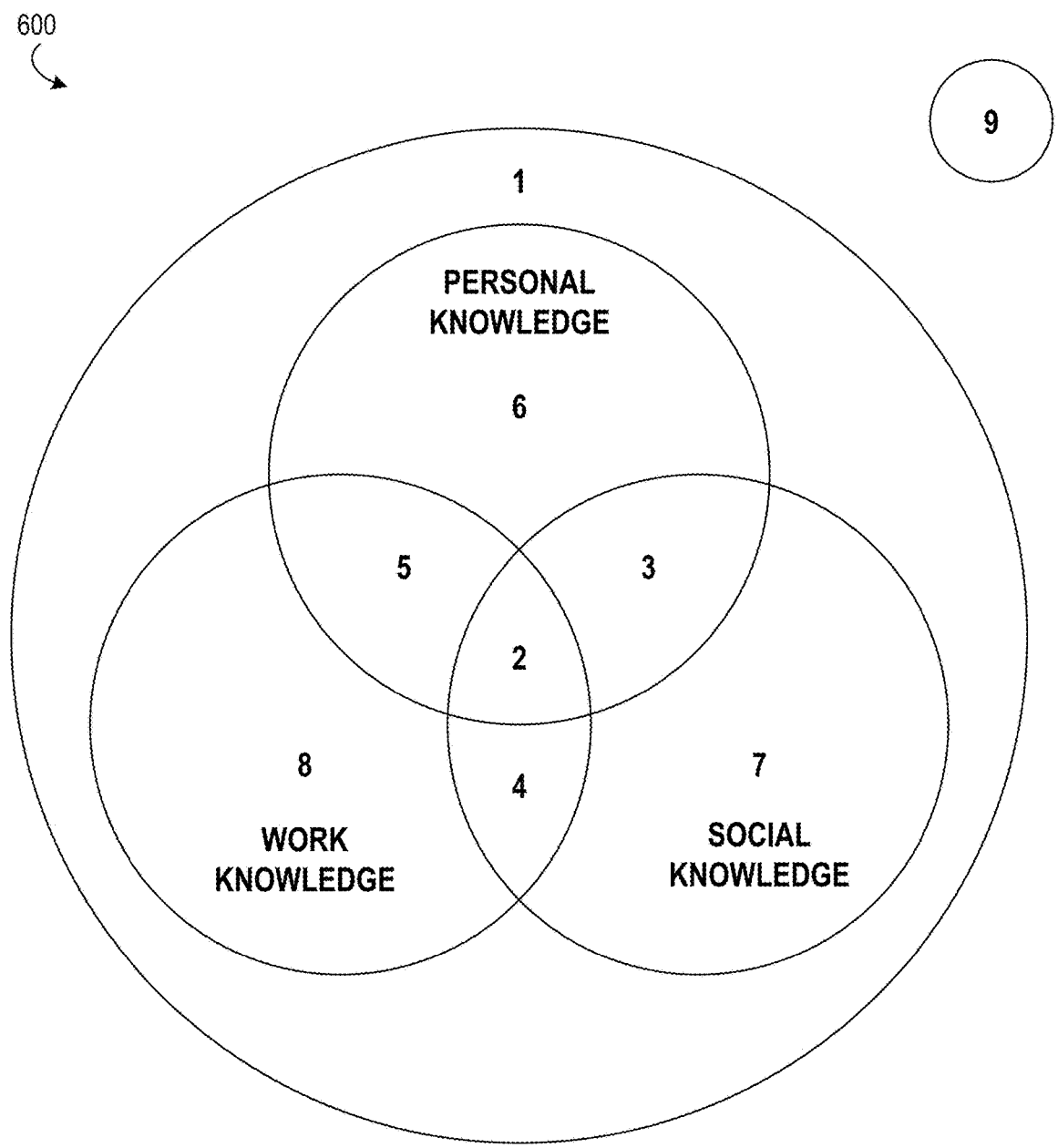
FIG. 6 depicts a potential threat model in accordance with aspects described herein.

Turning to FIG. 6, a potential threat model 600 that may be employed to identify potential threat sources is shown. As described above, the challenge questions may be based on work-related, personal-related, and social-related activities. As a result, potential threat sources include those individuals with knowledge of such activities. In FIG. 6, the different areas, some of which overlap, represent individuals having knowledge of the activities of an individual. Group 1 corresponds to individuals having all knowledge with respect to an individual. It is unlikely that anyone other than the individual himself would have knowledge of all of the activities associated with the individual being authenticated. Group 2 corresponds to individuals having personal-related, work-related, and social-related knowledge with respect to the individual. It is also unlikely that anyone other than the individual himself would have knowledge of all of the work-related, social-related, and personal-related activities associated with the individual. Group 3 corresponds to individuals having both personal-related and social-related knowledge with respect to the individual. Group 4 corresponds to individuals having both work-related and social-related knowledge with respect to the individual. Group 5 corresponds to individuals having both personal-related and work-related knowledge with respect to the individual. Group 6 corresponds to individuals having only personal-related knowledge with respect to the individual. Group 7 corresponds to individuals having only social-related knowledge with respect to the individual. Group 8 corresponds to individuals having only work-related knowledge with respect to the individual. Group 9 corresponds to individuals having no knowledge with respect to the individual. Based on this threat model, challenge models may be generated to minimize the potential threats identified.

Figure 7:
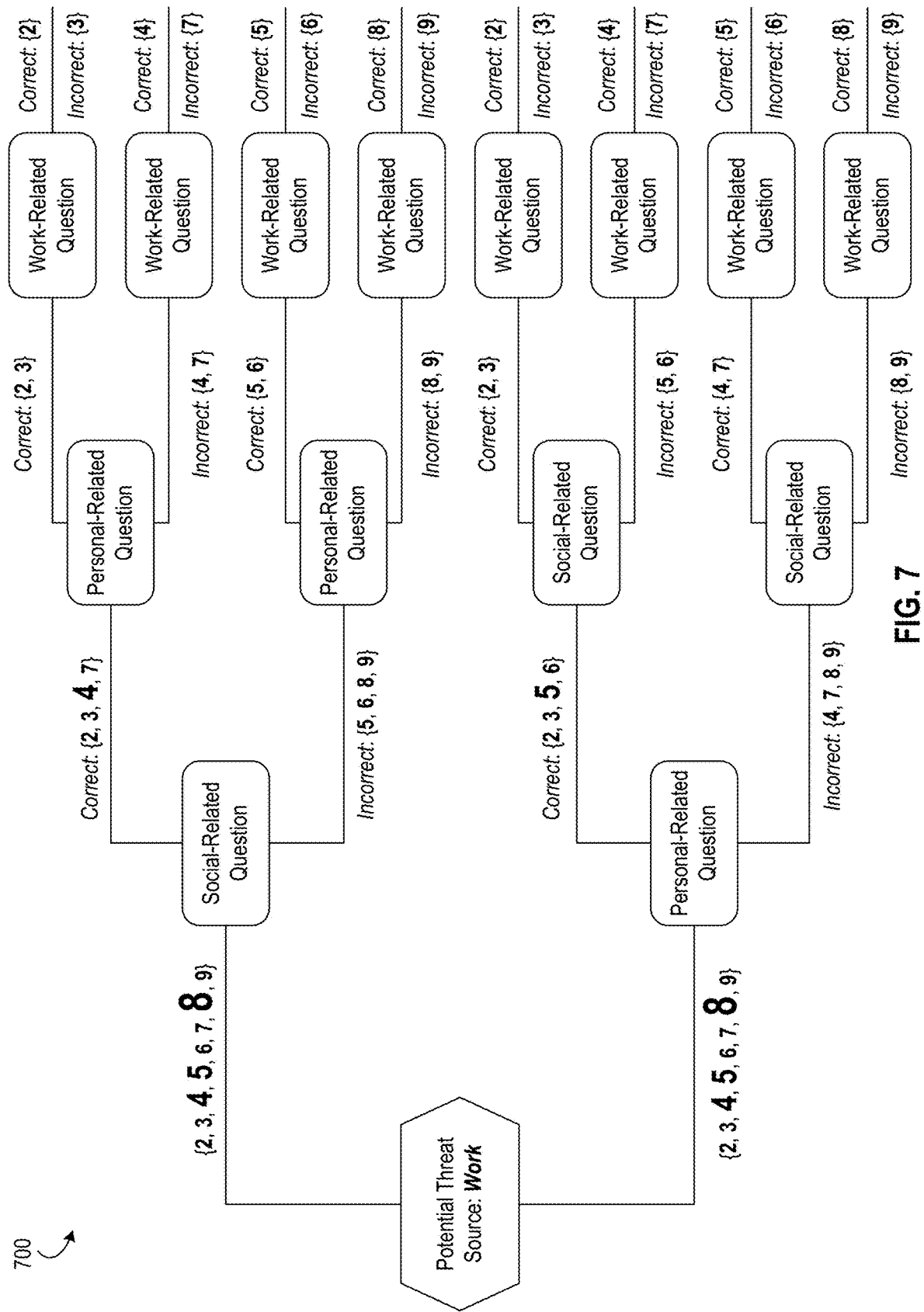
FIG. 7 depicts an example of an implementation of a challenge model for mitigating potential threats in accordance with aspects described herein.

In FIG. 7, an example of a challenge model 700 is shown. The example challenge model 700 is configured to minimize a potential threat source arising from an individual having a knowledge of work-related activities of the individual to be authenticated. In FIG. 7, the size of the group numbers represent the relative probability of the threat level. With respect to a work-related threat source, for example, the primary potential threat source likely comes from Group 8 (i.e., individuals having only work-related knowledge). The secondary potential threat sources likely come from Group 4 (i.e., individuals with both work-related and social-related knowledge) and Group 5 (i.e., individuals with both work-related and personal-related knowledge).

To minimize the potential threat sources, an authentication system may challenge the individual with a set of work-related, social-related, and personal-related questions. In FIG. 7, each node represents a type of question the individual may be challenged with. The branches between the nodes indicate the sequence of challenge questions that may be asked. The challenge model 700 also indicates, for each branch, how the potential threat sources change based on the type of challenge question presented, i.e., which groups are likely to answer the challenge question correctly or incorrectly. Before the first challenge question, the potential threat sources include Groups 2-9. The authentication system may reduce the breadth of the threat sources via the types of challenges questions presented to the individual to answer.

As seen in FIG. 7, for example, the potential threat source identified is someone with work-related knowledge of the individual. By asking either a social-related question or a family-related question, the potential threat sources are reduced. In particular, as seen in FIG. 7, by first asking a friend-related question, the potential threat sources are reduced to groups having social-related knowledge, i.e., Groups 2, 3, 4, and 7. In other words, only Groups 2-4 and 7 are likely to correctly answer the social-related question. By following with a personal-related question, the potential threat sources are further reduced to groups having both social-related and personal-related knowledge, i.e., Groups 2 and 3. By again following with a work-related question, the potential threat sources are reduced to the group having each of social-related, personal-related, and work-related knowledge which in this case is only Group 2. As noted above, an impostor attempting to gain unauthorized access is not likely to possess knowledge of social-, personal-, and work-related activities of an individual. As seen in the example challenge model 700, a sequence of three questions respectively associated with the social-, personal-, and work-related activities of an individual minimizes the potential threat source to a single group. Additional and alternative examples will be appreciated with reference to FIG. 7.

Figure 12:
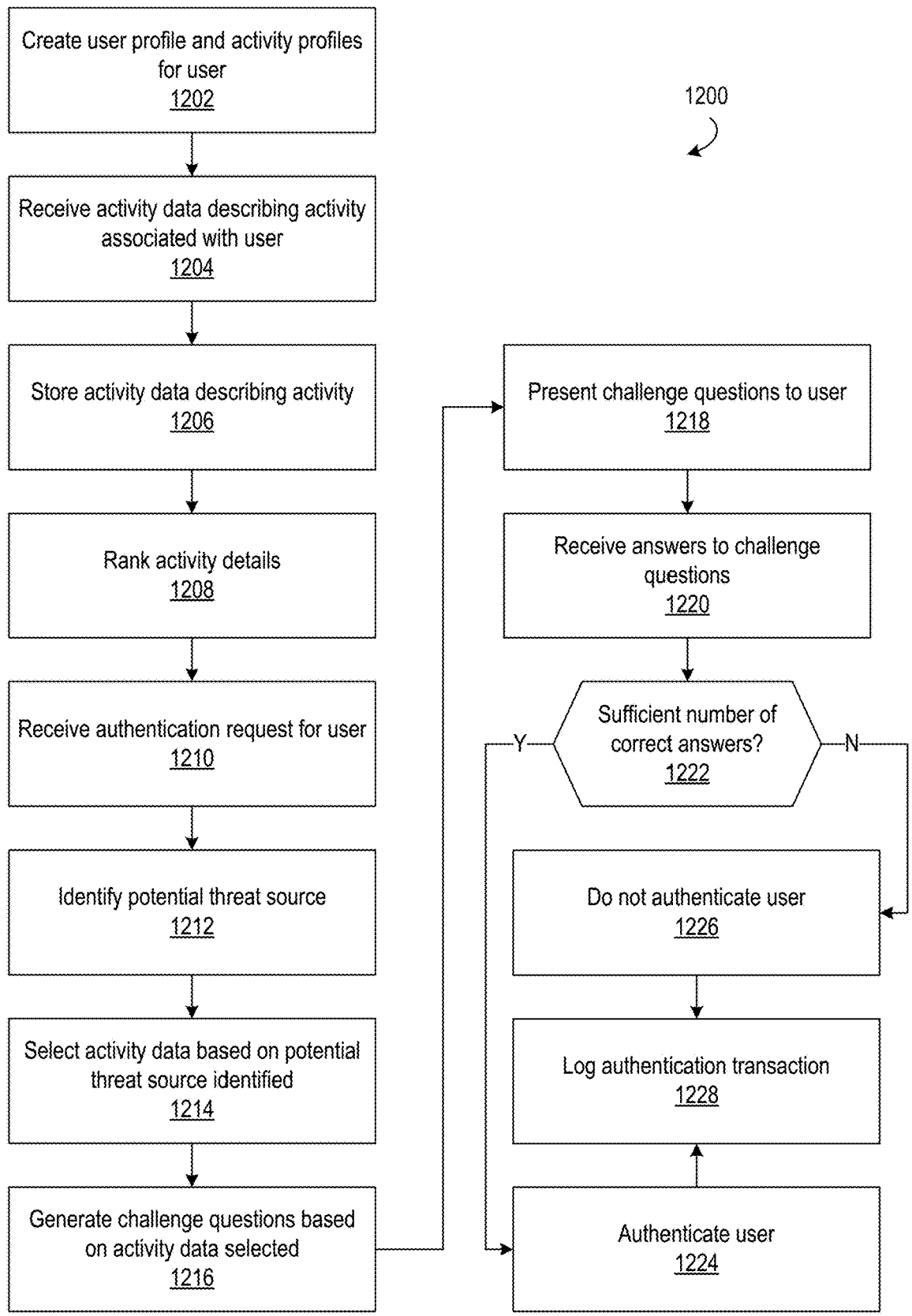
FIG. 12 depicts a flowchart of example method steps for authenticating a user in accordance with aspects described herein.

Referring now to FIG. 12, a flowchart 1200 of example method steps for authenticating a user is shown. An authentication system may first create a user profile and one or more activity profiles for a user (1202) as described above. The authentication system may then receive activity data describing activities associated with the user (1204), e.g., from various network-enabled devices as also described above. The authentication system may store the activity data received (1206) and rank the activity details (1208) as also described above.

The authentication system may then receive a request to authenticate the user (1210). In response to the authentication request, the authentication system may identify the potential threat source (1212) and select activity data to use for the challenge questions based on the potential threat source identified (1214) as described above. The authentication system may then generate one or more challenge questions based on the activity data selected (1216), e.g., a sequence of three challenge questions that include each of a work-related, personal-related, and social-related challenge question.

The authentication system may then provide the challenge questions to a user device for presentation to the user (1218). The user may select answers to the challenge questions, and the authentication system may receive the selected answers from the user device (1220). The authentication system may then determine whether the user answered the challenge questions correctly (1222). If the user answered a sufficient number of challenge questions correctly (1222:Y), then the authentication system may authenticate the user (1224). If the user did not answer a sufficient number of challenge questions correctly (1222:N), then the authentication system may not authenticate the user (1226). The authentication system may also log the authentication transaction (1228) and indicate whether the user was successfully authenticated.

Figure 13:
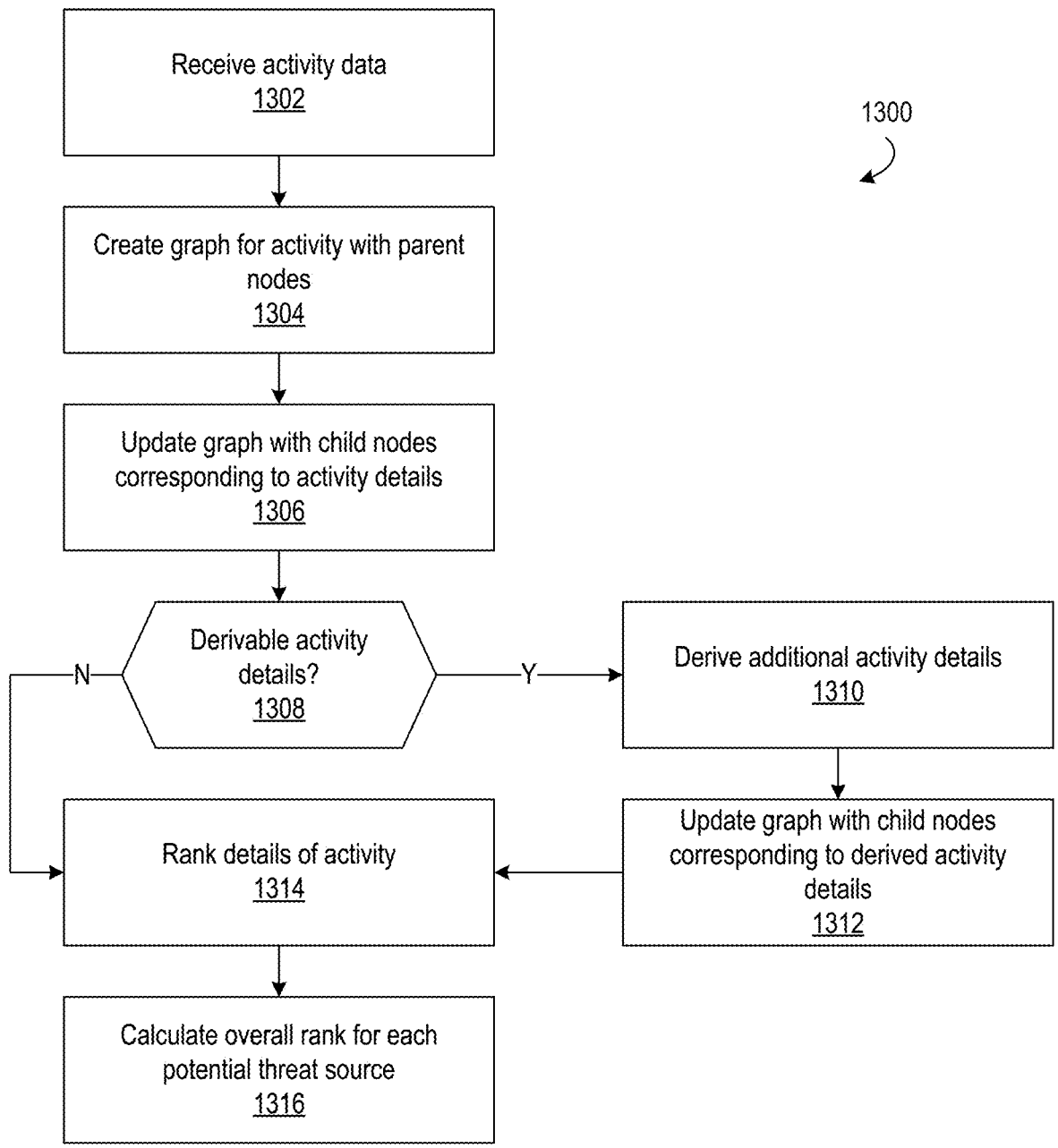
FIG. 13 depicts a flowchart of example method steps for processing an activity in accordance with aspects described herein.

In FIG. 13, a flowchart 1300 of example method steps for processing an activity is shown. An authentication system may receive activity data (1302), e.g., from a network-enabled device as described above. The authentication system may create a graph for the activity having parent nodes for the interrogative aspects of the activity (1304), e.g., what, who, when, and where. The authentication system may then update the graph with child nodes that correspond to the details associated with the interrogative aspects of the activity (1306).

The authentication system may then determine whether any activity details may be derived from the activity data received (1308). If so (1308:Y), the authentication system may derive one or more activity details (1310) and update the graph with child nodes that correspond to the derived activity details (1312). If not (1308:N), then the authentication system may rank the activity details (1314). If available, the authentication system may also rank the derived activity details. Based on the rankings of the activity details, the authentication system may determine an overall ranking for the activity (1316), e.g., for each potential threat source. Once the activity data has been ranked, the authentication system may utilize the ranked activity data to generate challenge questions for an authentication request.

Examples of questions and corresponding answers that may be presented to a user are shown in the tables below.

TABLE 1

| EXAMPLE PERSONAL-RELATED QUESTION. Where did you have dinner this past Wednesday? | |
|---|---|
| (A) | Uncle Jose's |
| (B) | Uncle Jiro's |
| (C) | Uncle Jacque's |
| (D) | Uncle John's |
| (E) | Uncle Jafar's |
| (F) | Uncle Joshua's |
| (G) | Uncle Johann's |

TABLE 2

EXAMPLE WORK-RELATED QUESTION.
Who did you meet with
on Feb. 24, 2015?

| | |
|---|---|
| (A) | Your boss |
| (B) | Your boss' boss |
| (C) | Your subordinate |
| (D) | Your assistant |
| (E) | Your team member |
| (F) | Your HR representative |
| (G) | Your client |

TABLE 3

EXAMPLE SOCIAL-RELATED QUESTION.
Who will you be meeting with
next Thursday at Monk's?

| | |
|---|---|
| (A) | B. Sacamano |
| (B) | Lomez |
| (C) | J. Riemenschneider |
| (D) | C. Ramirez |
| (E) | Specter |
| (F) | Doug |
| (G) | L. Nicademo |

TABLE 4

EXAMPLE FAMILY-RELATED QUESTION.
In which town did you recently
make a purchase for $1,138.43?

| | |
|---|---|
| (A) | Stone Mountain |
| (B) | Clarkston |
| (C) | Tucker |
| (D) | Snellville |
| (E) | Redan |
| (F) | Lithonia |
| (G) | Decatur |

TABLE 5

EXAMPLE SOCIAL-RELATED QUESTION.
What movie did you stream
two Saturdays ago?

| | |
|---|---|
| (A) | Death Blow |
| (B) | Agent Zero |
| (C) | Prognosis Negative |
| (D) | Sack Lunch |
| (E) | Chunnel |
| (F) | Firestorm |
| (G) | Checkmate |

TABLE 6

EXAMPLE PERSONAL-RELATED QUESTION.
What is the weekly temperature setting
on your home thermostat during
the hours of 9:00 AM to 5:00 PM?

| | |
|---|---|
| (A) | 72° |
| (B) | 73° |
| (C) | 74° |
| (D) | 75° |
| (E) | 76° |
| (F) | 77° |
| (G) | 78° |

TABLE 7

EXAMPLE PERSONAL-RELATED QUESTION.
What time is your coffee maker
programmed to start brewing?

| | |
|---|---|
| (A) | 5:30 AM |
| (B) | 5:35 AM |
| (C) | 5:40 AM |
| (D) | 5:45 AM |
| (E) | 5:50 AM |
| (F) | 5:55 AM |
| (G) | 6:00 AM |

In the examples above, the challenge questions are multiple choice questions. In example implementations, other types of questions may be selectively employed, e.g., fill-in-the-blank, matching, true/false, and the like.

As will be appreciated upon reading the disclosure, various aspects described herein may be embodied as a method, a computer system, or a computer program product. Accordingly, those aspects may take the form of an entirely hardware embodiment, an entirely software embodiment, or an embodiment combining software and hardware aspects. In addition, aspects may take the form of one or more computing devices configured to perform specified actions. Furthermore, such aspects may take the form of computer-executable instructions stored by one or more non-transitory computer-readable storage media. Any suitable computer-readable storage media may be utilized, including hard disks, volatile and/or non-volatile memory, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

As noted above, one or more computing devices may be employed to implement aspects of the disclosure. The computing devices may include a processing unit having one or more processors, random access memory (RAM), read-only memory (ROM), one or more input/output (I/O) devices, one or more network interfaces, and data storage at which resides an operating system, one or more applications, and data. The computing devices may include, for example, desktop computers, laptop computers, tablet computers, a handheld computers, a mobile telephones, television settop boxes, network-enabled televisions, network-enabled video game machines, and other types of computing devices configured to exchange wired or wireless communications across electric or electronic communication networks.

The I/O devices may include a microphone, keypad, touch screen, and/or stylus through which a user may provide input to the client computing device. The I/O devices may also include a speaker for providing audio output and a video display device for providing graphical output. Software may be stored at the data storage or ROM to provide instructions to the processing unit which executes the instructions. The networked environment supports connections between the computing devices and with other systems connected to the network. The network may include, for example, one or more of a local area network (LAN) a wide area network (WAN), a wireless telecommunications network, the Internet, and other types of networks that facilitate the exchange of communications between systems and devices. The computing devices may be connected to the network via a network interface which may be, for example, a modem, a network interface card (NIC) or a network adapter. The network interface may be a wired interface, a wireless interface, or both a wired and wireless interface. The network interface may thus include one or more transceivers, digital signal processors, and additional circuitry and software for exchanging wired or wireless communications with other systems and devices via the network. Such communications may be propagated via various network devices such as routers, base transceiver stations, and the like. The computing devices may utilize any of various network protocols such as TCP/IP, Ethernet, FTP, HTTP, and the like as well as any of various wireless communication technologies such as GSM, CDMA, WiFi, and WiMAX.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings.

For example, the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method of user authentication comprising:
   storing, at a data store of a computing device, an authentication log comprising a log entry corresponding to an authentication attempt performed in association with a user, wherein the log entry comprises:
      an indication of a question, provided during the authentication attempt, regarding an activity associated with the user;
      an indication of whether the question was answered correctly; and
      an indication of whether the user was successfully authenticated;
   evaluating, by the computing device and based on the log entry, whether the question was answered correctly and whether the user was successfully authenticated;
   responsive to determining the question was answered correctly and responsive to determining the user was not successfully authenticated:
      identifying, by the computing device, a type of the activity wherein the type of the activity is identified as either a work-related activity type, a social-related activity type, or a personal-related activity type;
      determining, by the computing device and based on the type of the activity identified, a potential threat source for the authentication attempt wherein the potential threat source is determined to be either a work-related threat, a social-related threat, or a personal related threat and wherein the potential threat source corresponds to the type of the activity identified; and
      providing, by the computing device and to the user, a notification of the potential threat source determined.

2. The method of claim 1, further comprising:
   determining, by the computing device and during the authentication attempt, an initial potential threat source for the authentication attempt wherein the initial potential threat source is determined to be either a work-related threat, a social-related threat, or a personal related threat.

3. The method of claim 2, further comprising:
   evaluating, by the computing device, whether the initial potential threat source determined during the authentication attempt matches the potential threat source determined based on the type of the activity identified.

4. The method of claim 3, further comprising:
   responsive to determining that the initial potential threat source determined does not match the potential threat source determined based on the type of the activity identified:
      adjusting, by the computing device and prior to a second authentication attempt performed subsequent to the authentication attempt performed in association with the user, operation of a process used to identify potential threat sources during user authentication.

5. The method of claim 1, further comprising:
   ranking, by the computing device and based on the type of the activity identified, a plurality of second activities selected for a second authentication attempt performed subsequent to the authentication attempt performed in association with the user.

6. The method of claim 5, further comprising:
   ranking, by the computing device and based on the type of the activity identified, a plurality of facts associated with a second activity of the plurality of second activities selected for the second authentication attempt.

7. The method of claim 1, further comprising:
   ranking, by the computing device and based on the type of the activity identified, a plurality of facts associated with a second activity selected for a second authentication attempt performed subsequent to the authentication attempt performed in association with the user.

8. The method of claim 1, wherein:
   the log entry further comprises an indication of a selected activity selected for the authentication attempt performed in association with the user.

9. The method of claim 1, wherein:
   the log entry further comprises an indication of an answer set associated with the question and provided during the authentication attempt.

10. The method of claim 1, wherein:
    the log entry further comprises at least one of an indication of a virtual location associated with the authentication attempt, an indication of a physical location associated with the authentication attempt, or combinations thereof.

11. A method of user authentication comprising: by a computing device configured to authenticate a user based, at least in part, on a potential threat source identified as either a work-related threat, a social-related threat, or a personal-related threat:
    storing, at a data store of the computing device, an authentication log comprising a log entry corresponding to a first authentication attempt performed in association with the user wherein the log entry comprises:
    an indication of a first question, provided during the first authentication attempt, regarding a first activity associated with the user;
    an indication of whether the first question was answered correctly; and
    an indication of whether the user was successfully authenticated;

evaluating, based on the log entry, whether the first question was answered correctly and Whether the user was successfully authenticated;

responsive to determining the first question was answered correctly and responsive to determining the user was not successfully authenticated:

identifying a first type of the first question, wherein the first type of the first question is one of a work-related question type, a social related question type, or a personal-related question type; and generating, for a second authentication attempt performed subsequent to the first authentication attempt and based on the first type of the first question, a second question about a second activity wherein the second question is of a second type different than the first type, Wherein the second type of the second question is one of a work-related question type, a social-related question type, or a personal-related question type.

12. The method of claim 11, further comprising:
ranking, by the computing device and based on the first type of the first question, a plurality of second questions wherein the plurality of second questions comprises the second question of the second type.

13. The method of claim 12, wherein:
the plurality of second questions comprise at least one question of the first type; and
the computing device ranks the at least one question of the first type relatively lower than the second question of the second type.

14. The method of claim 11, further comprising:
ranking, by the computing device and based on the first type of the first question, a plurality of second activities selected for the second authentication attempt wherein the plurality of second activities comprises the second activity of the second type.

15. The method of claim 11, further comprising:
ranking, by the computing device and based on the first type of the first question, a plurality of facts associated with the second activity about which the computing device generates the second question.

16. The method of claim 11, wherein:
the log entry further comprises an indication of an initial potential threat source determined for the first authentication attempt wherein the initial potential threat source is determined to be either a work-related threat, a social-related threat, or a personal related threat.

17. The method of claim 11, wherein:
the log entry further comprises an indication of an activity selected for the first authentication attempt performed in association with the user.

18. The method of claim 11, wherein:
the log entry further comprises an indication of an answer set associated with the first question and provided during the first authentication attempt.

19. The method of claim 11, wherein:
the log entry further comprises at least one of an indication of a virtual location associated with the first authentication attempt, an indication of a physical location associated with the first authentication attempt, or combinations thereof.

20. The method of claim 11, wherein:
the second authentication attempt is performed in association with a second user different from the user.

* * * * *

UNITED STATES PATENT AND TRADEMARK OFFICE
CERTIFICATE OF CORRECTION

Page 1 of 1

PATENT NO. : 10,594,674 B1
APPLICATION NO. : 15/727728
DATED : March 17, 2020
INVENTOR(S) : Chen et al.

It is certified that error appears in the above-identified patent and that said Letters Patent is hereby corrected as shown below:

In the Specification

Column 15, Detailed Description, Lines 14-15:
Delete "sub strings" and insert --substrings--

Column 15, Detailed Description, Line 26:
Delete "generation" and insert --creation--

Column 20, Detailed Description, Line 37:
Delete "week?")" and insert --week?"--

Column 28, Detailed Description, Line 47:
Delete "settop" and insert --set-top--

In the Claims

Column 31, Line 2:
In Claim 11, delete "Whether" and insert --whether--

Column 31, Line 15:
In Claim 11, delete "Wherein" and insert --wherein--

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*